United States Patent
Krishnaswamy et al.

(10) Patent No.: US 9,650,513 B2
(45) Date of Patent: May 16, 2017

(54) PHA COMPOSITIONS COMPRISING PBS AND PBSA AND METHODS FOR THEIR PRODUCTION

(71) Applicant: Metabolix, Inc., Cambridge, MA (US)

(72) Inventors: Rajendra K. Krishnaswamy, Pittsburgh, PA (US); Xiudong Sun, Arlington, MA (US)

(73) Assignee: CJ CheilJedang Corporation (KR)

( * ) Notice: Subject to any disclaimer, the term of this patent is extended or adjusted under 35 U.S.C. 154(b) by 0 days.

(21) Appl. No.: 14/702,437

(22) Filed: May 1, 2015

(65) Prior Publication Data

US 2016/0053111 A1 Feb. 25, 2016

Related U.S. Application Data

(63) Continuation of application No. 14/150,451, filed on Jan. 8, 2014, now Pat. No. 9,056,947, which is a continuation of application No. 13/959,715, filed on Aug. 5, 2013, now Pat. No. 8,629,212, which is a continuation of application No. 13/380,483, filed as application No. PCT/US2010/040037 on Jun. 25, 2010, now Pat. No. 8,524,856.

(60) Provisional application No. 61/269,582, filed on Jun. 26, 2009.

(51) Int. Cl.

| | |
|---|---|
| C08G 64/00 | (2006.01) |
| C08L 67/02 | (2006.01) |
| B32B 27/08 | (2006.01) |
| B32B 27/36 | (2006.01) |
| C08J 5/18 | (2006.01) |
| C08L 67/04 | (2006.01) |
| C08G 63/91 | (2006.01) |
| C08L 67/08 | (2006.01) |
| B32B 27/18 | (2006.01) |
| C08G 63/02 | (2006.01) |

(52) U.S. Cl.

CPC ............. *C08L 67/02* (2013.01); *B32B 27/08* (2013.01); *B32B 27/18* (2013.01); *B32B 27/36* (2013.01); *C08G 63/91* (2013.01); *C08G 63/912* (2013.01); *C08J 5/18* (2013.01); *C08L 67/04* (2013.01); *C08L 67/08* (2013.01); *B32B 2270/00* (2013.01); *B32B 2307/54* (2013.01); *B32B 2307/558* (2013.01); *B32B 2307/5825* (2013.01); *B32B 2307/7145* (2013.01); *B32B 2307/7163* (2013.01); *B32B 2307/738* (2013.01); *B32B 2410/00* (2013.01); *B32B 2435/00* (2013.01); *B32B 2439/00* (2013.01); *B32B 2457/00* (2013.01); *B32B 2509/00* (2013.01); *B32B 2535/00* (2013.01); *B32B 2553/00* (2013.01); *B32B 2555/00* (2013.01); *B32B 2605/00* (2013.01); *C08J 2367/02* (2013.01); *C08J 2367/04* (2013.01); *C08J 2467/04* (2013.01); *Y10T 428/31794* (2015.04)

(58) Field of Classification Search

CPC ....... C08G 64/307; C08G 64/06; C08G 64/14
USPC .................................................. 528/196, 198
See application file for complete search history.

(56) References Cited

U.S. PATENT DOCUMENTS

| | | | |
|---|---|---|---|
| 5,391,708 | A | 2/1995 | Hubbs et al. |
| 5,625,029 | A | 4/1997 | Hubbs et al. |
| 5,646,217 | A | 7/1997 | Hammond |
| 5,849,374 | A | 12/1998 | Gruber et al. |
| 5,849,401 | A | 12/1998 | El-Afandi et al. |
| 5,883,199 | A * | 3/1999 | McCarthy ............... A61L 15/26 428/35.2 |
| 5,994,478 | A | 11/1999 | Asrar et al. |
| 6,096,810 | A | 8/2000 | Asrar et al. |
| 6,156,852 | A | 12/2000 | Asrar |
| 6,191,203 | B1 | 2/2001 | Asrar |
| 6,312,823 | B1 | 11/2001 | El-Afandi et al. |
| 6,573,340 | B1 | 6/2003 | Khemani et al. |
| 6,579,934 | B1 | 6/2003 | Wang et al. |
| 6,645,618 | B2 | 11/2003 | Hobbs et al. |
| 6,669,771 | B2 | 12/2003 | Tokiwa et al. |
| 6,838,403 | B2 | 1/2005 | Tsai et al. |
| 6,890,649 | B2 | 5/2005 | Hobbs et al. |
| 6,890,989 | B2 | 5/2005 | Wang et al. |
| 7,098,292 | B2 | 8/2006 | Zhao et al. |
| 7,144,632 | B2 | 12/2006 | Hayes |
| 7,160,977 | B2 | 1/2007 | Hale et al. |
| 7,169,860 | B2 | 1/2007 | Bastioli et al. |
| 7,172,814 | B2 | 2/2007 | Hodson |
| 7,186,789 | B2 | 3/2007 | Hossainy et al. |
| 7,202,289 | B2 | 4/2007 | Nozaki et al. |
| 7,212,414 | B2 | 5/2007 | Baarman |
| 7,214,414 | B2 | 5/2007 | Khemani et al. |
| 7,264,641 | B2 | 9/2007 | Prasad |
| 7,297,394 | B2 | 11/2007 | Khemani et al. |
| 7,344,034 | B2 | 3/2008 | Heinrich et al. |

(Continued)

FOREIGN PATENT DOCUMENTS

| | | |
|---|---|---|
| EP | 0 648 238 B1 | 9/1999 |
| EP | 1 944 333 A1 | 7/2008 |

(Continued)

OTHER PUBLICATIONS

International Search Report for Int'l Application No. PCT/US2010/040037, "PHA Compositions Comprising PBS and PBSA and Methods for Their Production," Date Mailed: Feb. 1, 2011.

(Continued)

*Primary Examiner* — Terressa Boykin
(74) *Attorney, Agent, or Firm* — Foley Hoag LLP

(57) ABSTRACT

Compositions of PHAs with PBS and/or PBSA are described and methods of making the same.

13 Claims, 6 Drawing Sheets

(56) References Cited

U.S. PATENT DOCUMENTS

| | | |
|---|---|---|
| 7,344,784 B2 | 3/2008 | Hodson |
| 7,368,503 B2 | 5/2008 | Hale |
| 7,368,511 B2 | 5/2008 | Hale et al. |
| 7,491,213 B2 | 2/2009 | Perreault et al. |
| 7,678,444 B2 | 3/2010 | Tedford, Jr. et al. |
| 7,718,720 B2 | 5/2010 | Padwa |
| 7,846,987 B2 | 12/2010 | Handa |
| 8,524,856 B2 | 9/2013 | Krishnaswamy et al. |
| 8,629,212 B2 | 1/2014 | Krishnaswamy et al. |
| 9,056,947 B2 | 6/2015 | Krishnaswamy et al. |
| 2004/0166758 A1 | 8/2004 | Reichmann et al. |
| 2005/0101228 A1 | 5/2005 | Prasad |
| 2005/0107505 A1 | 5/2005 | Shinoda et al. |
| 2005/0136155 A1 | 6/2005 | Jordan et al. |
| 2005/0137304 A1 | 6/2005 | Strand et al. |
| 2005/0143502 A1 | 6/2005 | Yamada et al. |
| 2005/0154114 A1 | 7/2005 | Hale |
| 2006/0047026 A1 | 3/2006 | Yamada et al. |
| 2006/0183205 A1 | 8/2006 | Masaro et al. |
| 2007/0088099 A1 | 4/2007 | Mentink et al. |
| 2007/0228046 A1 | 10/2007 | Bastioli et al. |
| 2008/0255267 A1 | 10/2008 | Domb et al. |
| 2008/0281018 A1 | 11/2008 | Seeliger et al. |
| 2008/0311813 A1 | 12/2008 | Ting et al. |
| 2009/0123728 A1* | 5/2009 | Cheung ............... C08J 9/142 428/304.4 |
| 2009/0148656 A1 | 6/2009 | Hsu |
| 2009/0149570 A1 | 6/2009 | Cheng et al. |
| 2009/0179069 A1 | 7/2009 | Schmidt et al. |
| 2009/0215914 A1 | 8/2009 | Hirose et al. |
| 2009/0234035 A1 | 9/2009 | Cheung et al. |
| 2009/0247667 A1 | 10/2009 | Yao et al. |
| 2009/0286075 A1 | 11/2009 | Nakamura et al. |
| 2010/0041835 A1 | 2/2010 | Scherzer et al. |
| 2010/0071170 A1 | 3/2010 | Burout et al. |
| 2010/0089289 A1 | 4/2010 | Mahiat et al. |
| 2010/0193146 A1 | 8/2010 | Patel |
| 2010/0305280 A1* | 12/2010 | Whitehouse ............ A47L 13/17 525/450 |
| 2011/0189414 A1* | 8/2011 | Whitehouse ......... C08K 5/0083 428/35.7 |
| 2012/0108743 A1 | 5/2012 | Krishnaswamy et al. |
| 2013/0317163 A1 | 11/2013 | Krishnaswamy et al. |

FOREIGN PATENT DOCUMENTS

| | | |
|---|---|---|
| JP | 2007-161957 | 6/2007 |
| WO | WO 2006/012670 A1 | 2/2006 |
| WO | WO 2008/007919 A1 | 1/2008 |
| WO | WO 2010/151798 A2 | 12/2010 |

OTHER PUBLICATIONS

Notification Concerning Transmittal of International Preliminary Report on Patentability, International Application No. PCT/US2010/040037, "PHA Compositions Comprising PBS and PBSA and Methods for Their Production," Date of mailing: Jan. 12, 2012.

Patent Examination Report No. 1, Australian Patent Application No. 2010265939; Date of Issue: Sep. 27, 2012.

Notice of Allowance and Fees Due, U.S. Appl. No. 13/959,715, Date Mailed: Sep. 10, 2013.

Saravanan D. et al., "Synthesis and characterization of cross linked chitin/bentonite polymer blend and adsorption studies of Cu (II) and Cr (VI) on chitin," Scholars Research Library Der Pharma Chemica, 3(6):406-424 (2011).

* cited by examiner

PHA COMPOSITIONS COMPRISING PBS AND PBSA AND METHODS FOR THEIR PRODUCTION

RELATED APPLICATIONS

This application is a continuation of U.S. application Ser. No. 14/150,451, filed on Jan. 8, 2014, which is a continuation of U.S. application Ser. No. 13/959,715, filed Aug. 5, 2013, now U.S. Pat. No. 8,629,212, which is a continuation of U.S. application Ser. No. 13/380,483, filed Dec. 22, 2011, now U.S. Pat. No. 8,524,856, which is the U.S. National Stage of International Application No. PCT/US2010/040037, filed on Jun. 25, 2010, which designated the U.S., published in English, which claims the benefit of U.S. Provisional Application No. 61/269,582, filed on Jun. 26, 2009. The entire teachings of the above applications are incorporated herein by reference.

BACKGROUND OF THE INVENTION

Biodegradable plastics are of increasing industrial interest as replacements or supplements for non-biodegradable plastics in a wide range of applications and in particular for packaging applications. One class of biodegradable polymers is the polyhydroxyalkanoates (PHAs), which are linear, aliphatic polyesters that can be produced by numerous microorganisms for use as intracellular storage material. Articles made from the polymers are generally recognized by soil microbes as a food source. There has therefore been a great deal of interest in the commercial development of these polymers, particularly for disposable consumer items. The polymers exhibit good biodegradability and useful physical properties.

In some applications, the rapid biodegradability of PHAs is a problem, and therefore a need exists for compositions that assist in controlling the rate of biodegradation of PHAs.

SUMMARY OF THE INVENTION

In accordance with embodiments of the invention, compositions of branched polymer compositions comprising polyhydroxyalkanoates (PHAs) and either poly(butylene succinate) (PBS) or polybutylene succinate adipate (PBSA) or combinations thereof are provided. The PHAs are reactive blended with the PBS or PBSA and in some embodiments, combinations of the polymers. In particular, when the polymers are melt-blended in the presence of a branching agent, for example, organic peroxide, (e.g., reactive blending or reactive melt blending) the resultant compositions display many unexpected synergies in melt rheology, melt stability, processing and properties, such as film processing and film properties. In addition, the biodegradation kinetics of PHB copolymers can be slowed down by combining some PBS and/or PBSA into the composition. In certain aspects, the process of reactive blending further includes the use of a reactive cross-linking agent resulting in improved properties. In one embodiment, the PHA and PBS is blended, i.e., to a homogeneous blend. In another embodiment, the PHA and PBSA is blended, i.e., to a homogenous blend. In certain aspects, the polymers of the compositions are mixed together to form a blend.

In related embodiments, reacting with a branching agent is performed in the presence of a co-agent (also referred to herein, as a "cross-linking agent), thereby forming a branched polymer blend. The conditions of the reaction are suitable for reacting the branching agent alone or with a cross-linking agent and a polymer blend. A "branched" polymer is a polymer with a branching of the polymer chain or cross-linking of two or more polymer chains.

The cross-linking agent when reacted, for example, at its epoxide group(s) or double bond(s), becomes bonded to another molecule, e.g., a polymer or branched polymer. As a consequence the multiple molecules become cross-linked through the reactive group on the cross-linking agent. An "epoxy functional compound" is a cross-linking agent comprising two or more epoxy functional groups.

In accordance with other related aspects of the invention, the functional group of the cross-linking agent is an epoxy-functional compound, for example, an epoxy-functional styrene-acrylic polymer, an epoxy-functional acrylic copolymer, an epoxy-functional polyolefin copolymer, oligomers comprising glycidyl groups with epoxy functional side chains, an epoxy-functional poly(ethylene-glycidyl methacrylate-co-methacrylate), or an epoxidized oil, poly(ethylene-co-methacrylate-coglycidyl methacrylate, ethylene-n-butyl acrylate-glycidyl methacrylate or combinations thereof.

In another related embodiment, the cross-linking agent contains at least two reactive double bonds. These cross-linking agents include but is not limited to the following: diallyl phthalate, pentaerythritol tetraacrylate, trimethylolpropane triacrylate, pentaerythritol triacrylate, dipentaerythritol pentaacrylate, diethylene glycol dimethacrylate, bis(2-methacryloxyethyl)phosphate, or combinations thereof.

In accordance with other related embodiments, a method of preparing a branched polymer composition, comprising reacting a PHA and a PBS with a branching agent, and forming a branched polymer composition comprising a branched PHA and PBS blend is described. In another embodiment, a method of preparing a branched polymer composition is described, comprising reacting a PHA and PBSA with a branching agent, and forming a branched polymer composition comprising a branched PHA and PBSA blend. In certain embodiments, the method wherein the composition further comprises PBSA.

Additives may also be included in the compositions and methods of the inventions. In particular embodiments, a nucleating agent is added.

In still another embodiment, a method of preparing a film comprising a branched polymer composition is described. The method comprises reacting a PHA with a branching agent, reacting a PBS with a branching agent, and forming a branched PBS polymer composition. Then, exposing the branched PHA composition to conditions that cause melting of the PHA, thereby forming a molten branched PHA composition, exposing the branch PBS composition to conditions that cause melting of the PBS, thereby forming a molten branched PBS composition, co-extruding the molten PHA compositions and the molten PBS compositions to form a multi-layered film; thereby making a film comprising branched PHA and branched PBS layers.

Also described is a method of preparing a film comprising a branched polymer composition, comprising reacting a PHA with a branching agent, thereby forming a branched PHA polymer composition, reacting a PBSA with a branching agent, thereby forming a branched PBSA polymer composition, exposing the branch PHA composition to conditions that cause melting of the PHA, thereby forming a molten branched PHA composition, exposing the branch PBS composition to conditions that cause melting of the PBSA, thereby forming a molten branched PBSA composition, co-extruding the molten PHA compositions and the molten PBSA compositions to form a multi-layered film; thereby making a film comprising branched PHA and branched PBS.

In still another embodiment, a method of making an article comprising a branched PHA and branched PBS composition comprising the steps of: melt-blending PHA and PBS and a branching agent under conditions that cause melting and branching of the PHA polymer and the PBS, thereby forming a molten branched polymer composition; and forming an article from the branched molten polymer composition; thereby making an article comprising branched polymer composition of branched PHA and branched PBS.

In yet another method an article is prepared comprising a branched PHA and branched PBSA composition comprising the steps of: melt-blending PHA and PBSA and a branching agent under conditions that cause melting and branching of the PHA polymer and the PBSA, thereby forming a molten branched polymer composition; and forming an article from the branched molten polymer composition; thereby making an article comprising branched polymer composition of branched PHA and branched PBSA.

In certain embodiment, a film is prepared by the methods described herein, the resultant film has greater tear resistance according to ASTM D1922-06, greater puncture resistance according to D1709-04, or greater tensile strength according to D882-02 than a corresponding PHA film made without PBS and/or PBSA. In some aspects, the film possesses properties that are 25% greater, 50% greater or 75-100% greater. In certain aspects, the film is a blend of branched PHA and branched PBS or branched PHA and branched PBSA. In other aspects, the film comprises layers of branched PHA alternating with branched PBS or branched PBSA.

In accordance with another related aspects, compositions are described that comprise branched PHA and branched PBS or branched PHA and branched PBSA. In particular embodiments, the PHA is a PHA blend of about 58-62% homo-polymer of 3-hydroxybutanoic acid, and about 38-42% copolymer of 3-hydroxybutanoic acid and 4-hydroxybutanoic acid, where the 4-hydroxybutanoic acid is about 8-14% weight percent or a PHBV with the hydroxyvalerate is about 7% weight percent or a blend of a copolymer of about 34-38% homo-polymer of 3-hydroxybutanoic acid, and about 22-26% co-polymer of 3-hydroxybutanoic acid and 4-hydroxybutanoic acid, where the 4-hydroxybutanoic acid is approximately 8-14 weight percent, and a copolymer of about 38-42% co-polymer of 3-hydroxybutanoic acid and 4-hydroxybutanoic acid with the 4-hydroxybutanoic acid composition being nominally 25-33 weight percent.

DETAILED DESCRIPTION OF THE INVENTION

Figure 1:
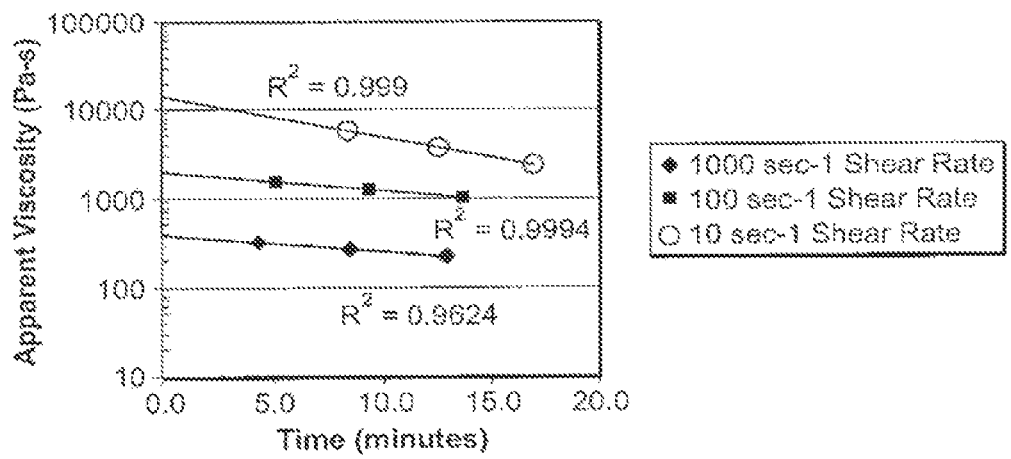
FIG. 1 is a plot showing apparent Viscosity vs. time.

This invention relates to compositions comprising polyhydroxyalkanoates (PHAs) and poly(butylene succinate) (PBS) and/or poly(butylene succinate adipate) (PBSA) reacted with branching agents, methods of making the compositions, and articles made from the compositions. The compositions are useful in applications such as articles, including film, injection molded articles, sheets, foam and thermoformed articles, the like.

The invention provides branched polymer compositions and methods of preparing branched polymers with improved mechanical and rheological properties. The polymer compositions include preparing branched PHA and branched PBS or branched PBSA compositions and combinations of these polymers.

Combining (e.g, mixing or blending) the polymer blends in the presence of peroxide provides the following benefits compared to combining the polymer blends without any reactive chemistry: (1) higher melt strength, (2) improved melt stability and/or better melt capillary stability, resulting in a broader processing window for the overall composition, (3) synergistic film properties, e.g., film tear properties of the compositions are better than PHA or PBS and/or PBSA film by itself, (4) higher toughness for injection molded bars, and (5) lower flash during injection molding process.

The use of cross-linking agents (co-agents) further improve the desired properties of the polymer composition over the starting compositions without the cross-linking agents and branching agents. In one aspect, the cross-linking agents comprise two or more reactive groups such as double bonds or epoxides. These cross-linking agents react with and become covalently bonded (connected) to the polymer. The connection of multiple chains through these cross-linking agents form a branched polymer. The branched polymer has increased melt strength over the melt strength of the starting polymer.

Increased melt strength is useful in that it allows the polymers to be formed under a broader temperature range when the polymer is processed. This property for broader processing temperatures for polymer applications, such as in the production of blown film (i.e., in preventing or reducing bubble collapse), or cast film extrusion, thermoformed articles (i.e., preventing or reducing sheet sag during thermoforming), profile extruded articles (i.e., preventing or reducing sag), non-woven fibers, monofilament, etc.

The polymers' stability is effected at processing temperatures and can accordingly experience a drop in melt strength. This can cause difficulties in processing these polymers. These shortcomings are addressed by the compositions and methods of the invention. Additionally, the improvement shown in films made from the methods are compositions described herein are greater tensile strength, tear resistance and greater puncture resistance.

The methods and branched compositions of the invention improve the melt strength of polymer compositions, a desirable property for many polymer product applications. Melt strength is a rheological property that can be measured a number of ways. One measure is G.' G' is the polymer storage modulus measured at melt processing temperatures.

Physical properties and rheological properties of polymeric materials depend on the molecular weight and distribution of the polymer. "Molecular weight" is calculated in a number of different ways. Unless other wise indicated, "molecular weight" refers to weight average molecular weight.

"Number average molecular weight" (Mn) represents the arithmetic mean of the distribution, and is the sum of the products of the molecular weights of each fraction, multiplied by its mole fraction (ΣNiMi/ΣNi).

"Weight average molecular weight" (Mw) is the sum of the products of the molecular weight of each fraction, multiplied by its weight fraction (ΣNiMi2/ΣNiMi). Mw is generally greater than or equal to Mn.

One way of increasing the melt strength is by branching the polymers (PHA, PBS and PBSA and combinations thereof), and various methods for accomplishing this are described herein. Branching of PHA is a result of reacting with branching agents, for example, peroxides. Also, cross-linking agents, for example, reactive compounds (compounds with epoxy groups and compounds with reactive double bonds) that enhance or increase the branching of the polymer, can also be used.

Addition of other reactive polymeric compounds, such as reactive acrylics, can also be employed to the rate of branching architecture of the PHA. The use and selection of additives to these compositions result in improved properties. All of these methods are described herein.

Polybutylene Succinate and Poly Butylene Succinate Adipate

Poly butylene succinate (PBS) and poly butylene succinate adipate (PBSA) are synthetic, petroleum-based aliphatic polyesters, made by condensation polymerization followed by chain extension using multi-functional isocyanates. PBS is a combination of 1,4 butane diol and succinic acid, while PBSA is a combination of 1,4 butane diol, succinic acid, and adipic acid. Although usually synthesized from petroleum, it is also possible for the monomers that make up PBS and PBSA to be produced from biobased feedstock.

PBS and PBSA are commercially available for example from, Showa HighPolymer, Japan; SkyGreen BDP, Korea; and SK Polymer, Ire Chemicals Co., Korea; and Sqehan Co, Korea; among others.

The two polymers are reportedly biodegradable at ambient temperatures (i.e., are "cold compostable") in soil and marine conditions. PBS degrades more slowly compared to PBSA. PBS is hydro-biodegradable and begins to biodegrade via a hydrolysis mechanism. Hydrolysis occurs at the ester linkages and this results in a lowering of the polymer's molecular weight, allowing for further degradation by micro-organisms. Further, PBS and PBSA are known to biodegrade more slowly than PHAs, which are also cold-compostable.

Of the two, PBS has higher crystallinity, and is better suited for molding, while PBSA has lower crystallinity, is better suited to film applications. Both polymers have a low (sub-zero) glass transition temperature (Tg), and their processing temperatures overlap with PHAs. As disclosed herein, PHA polymers can be combined with PBS and/or PBSA using conventional melt-blending techniques. In this invention, the above-mentioned blends are melt-blended in the presence of a reactive entity such as organic peroxide branching agents; branching co-agents may also be used. The reactive blending approach produces compositions that have considerably better melt and solid-state properties compared to the non-reactive blends. In particular, the reactive (inventive) blends have higher melt strength, broader processing window, and better mechanical properties. As shown herein, the crystallization of PHA is influenced significantly by the presence of even small amounts of PBS and/or PBSA. Reactive blends were found to process very well, with improved anti-blocking behavior, higher line speeds and better roll-release behavior. Addition of PBS and/or PBSA to PHAs improved the tear, puncture, and tensile strength performance of PHA films. In general, PBSA performed better when blended with PHA than did PBS. Reactive blending resulted in considerably better performance characteristics of the finished film relative to equivalent dry blends. Addition of as little as 25% PBSA doubled the tear and puncture resistance of PHA films. The addition of PBS and PBSA also reduced flash in injection molding applications.

Polyhydroxyalkanoates (PHAs)

Polyhydroxyalkanoates are biological polyesters synthesized by a broad range of natural and genetically engineered bacteria as well as genetically engineered plant crops (Braunegg et al., (1998), J. Biotechnology 65:127-161; Madison and Huisman, 1999, Microbiology and Molecular Biology Reviews, 63:21-53; Poirier, 2002, Progress in Lipid Research 41:131-155). These polymers are biodegradable thermoplastic materials, produced from renewable resources, with the potential for use in a broad range of industrial applications (Williams & Peoples, CHEMTECH 26:38-44 (1996)). Useful microbial strains for producing PHAs, include *Alcaligenes eutrophus* (renamed as *Ralstonia eutropha*), *Alcaligenes latus, Azotobacter, Aeromonas, Comamonas, Pseudomonads*, and genetically engineered organisms including genetically engineered microbes such as *Pseudomonas, Ralstonia* and *Escherichia coli*.

In general, a PHA is formed by enzymatic polymerization of one or more monomer units inside a living cell. Over 100 different types of monomers have been incorporated into the PHA polymers (Steinbüchel and Valentin, 1995, FEMS Microbiol. Lett. 128:219-228. Examples of monomer units incorporated in PHAs include 2-hydroxybutyrate, lactic acid, glycolic acid, 3-hydroxybutyrate (hereinafter referred to as 3HB), 3-hydroxypropionate (hereinafter referred to as 3HP), 3-hydroxyvalerate (hereinafter referred to as 3HV), 3-hydroxyhexanoate (hereinafter referred to as 3HH), 3-hydroxyheptanoate (hereinafter referred to as 3HHep), 3-hydroxyoctanoate (hereinafter referred to as 3HO), 3-hydroxynonanoate (hereinafter referred to as 3HN), 3-hydroxydecanoate (hereinafter referred to as 3HD), 3-hydroxydodecanoate (hereinafter referred to as 3HDd), 4-hydroxybutyrate (hereinafter referred to as 4HB), 4-hydroxyvalerate (hereinafter referred to as 4HV), 5-hydroxyvalerate (hereinafter referred to as 5HV), and 6-hydroxyhexanoate (hereinafter referred to as 6HH). 3-hydroxyacid monomers incorporated into PHAs are the (D) or (R) 3-hydroxyacid isomer with the exception of 3HP which does not have a chiral center.

In some embodiments, the PHA in the methods described herein is a homopolymer (where all monomer units are the same). Examples of PHA homopolymers include poly 3-hydroxyalkanoates (e.g., poly 3-hydroxypropionate (hereinafter referred to as P3HP), poly 3-hydroxybutyrate (hereinafter referred to as PHB) and poly 3-hydroxyvalerate), poly 4-hydroxyalkanoates (e.g., poly 4-hydroxybutyrate (hereinafter referred to as P4HB), or poly 4-hydroxyvalerate (hereinafter referred to as P4HV)) and poly 5-hydroxyalkanoates (e.g., poly 5-hydroxyvalerate (hereinafter referred to as P5HV)).

In certain embodiments, the starting PHA can be a copolymer (containing two or more different monomer units) in which the different monomers are randomly distributed in the polymer chain. Examples of PHA copolymers include poly 3-hydroxybutyrate-co-3-hydroxypropionate (hereinafter referred to as PHB3HP), poly 3-hydroxybutyrate-co-4-hydroxybutyrate (hereinafter referred to as PHB4HB), poly 3-hydroxybutyrate-co-4-hydroxyvalerate (hereinafter referred to as PHB4HV), poly 3-hydroxybutyrate-co-3-hydroxyvalerate (hereinafter referred to as PHB3HV), poly 3-hydroxybutyrate-co-3-hydroxyhexanoate (hereinafter referred to as PHB3HH) and poly 3-hydroxybutyrate-co-5-hydroxyvalerate (hereinafter referred to as PHB5HV).

By selecting the monomer types and controlling the ratios of the monomer units in a given PHA copolymer a wide range of material properties can be achieved. Although examples of PHA copolymers having two different monomer units have been provided, the PHA can have more than two different monomer units (e.g., three different monomer units, four different monomer units, five different monomer units, six different monomer units) An example of a PHA having 4 different monomer units would be PHB-co-3HH-co-3HO-co-3HD or PHB-co-3-HO-co-3HD-co-3HDd (these types of PHA copolymers are hereinafter referred to as PHB3HX). Typically where the PHB3HX has 3 or more monomer units the 3HB monomer is at least 70% by weight of the total monomers, preferably 85% by weight of the total monomers, most preferably greater than 90% by weight of the total monomers for example 92%, 93%, 94%, 95%, 96% by weight of the copolymer and the HX comprises one or more monomers selected from 3HH, 3HO, 3HD, 3HDd.

The homopolymer (where all monomer units are identical) PHB and 3-hydroxybutyrate copolymers (PHB3HP, PHB4HB, PHB3HV, PHB4HV, PHB5HV, PHB3HHP, hereinafter referred to as PHB copolymers) containing 3-hydroxybutyrate and at least one other monomer are of particular interest for commercial production and applications. It is useful to describe these copolymers by reference to their material properties as follows. Type 1 PHB copolymers typically have a glass transition temperature (Tg) in the range of 6° C. to −10° C., and a melting temperature TM of between 80° C. to 180° C. Type 2 PHB copolymers typically have a Tg of −20° C. to −50° C. and Tm of 55° C. to 90° C. In particular embodiments, the Type 2 copolymer has a phase component with a Tg of −15° C. to −45° C. and no Tm.

Preferred Type 1 PHB copolymers have two monomer units have a majority of their monomer units being 3-hydroxybutyrate monomer by weight in the copolymer, for example, greater than 78% 3-hydroxybutyrate monomer. Preferred PHB copolymers for this invention are biologically produced from renewable resources and are selected from the following group of PHB copolymers:

PHB3HV is a Type 1 PHB copolymer where the 3HV content is in the range of 3% to 22% by weight of the polymer and preferably in the range of 4% to 15% by weight of the copolymer for example: 4% 3HV; 5% 3HV; 6% 3HV; 7% 3HV; 8% 3HV; 9% 3HV; 10% 3HV; 11% 3HV; 12% 3HV; 13% 3HV; 14% 3HV; 15% 3HV;

PHB3HP is a Type 1 PHB copolymer where the 3HP content is in the range of 3% to 15% by weight of the copolymer and preferably in the range of 4% to 15% by weight of the copolymer for example: 4% 3HP; 5% 3HP; 6% 3HP; 7% 3HP; 8% 3HP; 9% 3HP; 10% 3HP; 11% 3HP; 12% 3HP. 13% 3HP; 14% 3HP; 15% 3HP.

PHB4HB is a Type 1 PHB copolymer where the 4HB content is in the range of 3% to 15% by weight of the copolymer and preferably in the range of 4% to 15% by weight of the copolymer for example: 4% 4HB; 5% 4HB; 6% 4HB; 7% 4HB; 8% 4HB; 9% 4HB; 10% 4HB; 11% 4HB; 12% 4HB; 13% 4HB; 14% 4HB; 15% 4HB.

PHB4HV is a Type 1 PHB copolymer where the 4HV content is in the range of 3% to 15% by weight of the copolymer and preferably in the range of 4% to 15% by weight of the copolymer for example: 4% 4HV; 5% 4HV; 6% 4HV; 7% 4HV; 8% 4HV; 9% 4HV; 10% 4HV; 11% 4HV; 12% 4HV; 13% 4HV; 14% 4HV; 15% 4HV.

PHB5HV is a Type 1 PHB copolymer where the 5HV content is in the range of 3% to 15% by weight of the copolymer and preferably in the range of 4% to 15% by weight of the copolymer for example: 4% 5HV; 5% 5HV; 6% 5HV; 7% 5HV; 8% 5HV; 9% 5HV; 10% 5HV; 11% 5HV; 12% 5HV; 13% 5HV; 14% 5HV; 15% 5HV.

PHB3HH is a Type 1 PHB copolymer where the 3HH content is in the range of 3% to 15% by weight of the copolymer and preferably in the range of 4% to 15% by weight of the copolymer for example: 4% 3HH; 5% 3HH; 6% 3HH; 7% 3HH; 8% 3HH; 9% 3HH; 10% 3HH; 11% 3HH; 12% 3HH; 13% 3HH; 14% 3HH; 15% 3HH;

PHB3HX is a Type 1 PHB copolymer where the 3HX content is comprised of 2 or more monomers selected from 3HH, 3HO, 3HD and 3HDd and the 3HX content is in the range of 3% to 12% by weight of the copolymer and preferably in the range of 4% to 10% by weight of the copolymer for example: 4% 3HX; 5% 3HX; 6% 3HX; 7% 3HX; 8% 3HX; 9% 3HX; 10% 3HX by weight of the copolymer.

Type 2 PHB copolymers have a 3HB content of between 80% and 5% by weight of the copolymer, for example 80%, 75%, 70%, 65%, 60%, 55%, 50%, 45%, 40%, 35%, 30%, 25%, 20%, 15%, 10%, 5% by weight of the copolymer.

PHB4HB is a Type 2 PHB copolymer where the 4HB content is in the range of 20% to 60% by weight of the copolymer and preferably in the range of 25% to 50% by weight of the copolymer for example: 25% 4HB; 30% 4HB; 35% 4HB; 40% 4HB; 45% 4HB; 50% 4HB by weight of the copolymer.

PHB5HV is a Type 2 PHB copolymer where the 5HV content is in the range of 20% to 60% by weight of the copolymer and preferably in the range of 25% to 50% by weight of the copolymer for example: 25% 5HV; 30% 5HV; 35% 5HV; 40% 5HV; 45% SHY; 50% 5HV by weight of the copolymer.

PHB3HH is a Type 2 PHB copolymer where the 3HH is in the range of 35% to 95% by weight of the copolymer and preferably in the range of 40% to 80% by weight of the copolymer for example: 40% 3HH; 45% 3HH; 50% 3HH; 55% 3HH, 60% 3HH; 65% 3HH; 70% 3HH; 75% 3HH; 80% 3HH by weight of the copolymer.

PHB3HX is a Type 2 PHB copolymer where the 3HX content is comprised of 2 or more monomers selected from 3HH, 3HO, 3HD and 3HDd and the 3HX content is in the range of 30% to 95% by weight of the copolymer and preferably in the range of 35% to 90% by weight of the copolymer for example: 35% 3HX; 40% 3HX; 45% 3HX; 50% 3HX; 55% 3HX 60% 3HX; 65% 3HX; 70% 3HX; 75% 3HX; 80% 3HX; 85% 3HX; 90% 3HX by weight of the copolymer.

PHAs for use in the methods, compositions and pellets described in this invention are selected from: PHB or a Type 1 PHB copolymer; a PHA blend of PHB with a Type 1 PHB copolymer where the PHB content by weight of PHA in the PHA blend is in the range of 5% to 95% by weight of the PHA in the PHA blend; a PHA blend of PHB with a Type 2

PHB copolymer where the PHB content by weight of the PHA in the PHA blend is in the range of 5% to 95% by weight of the PHA in the PHA blend; a PHA blend of a Type 1 PHB copolymer with a different Type 1 PHB copolymer and where the content of the first Type 1 PHB copolymer is in the range of 5% to 95% by weight of the PHA in the PHA blend; a PHA blend of a Type 1 PHB copolymer with a Type 2 PHA copolymer where the content of the Type 1 PHB copolymer is in the range of 30% to 95% by weight of the PHA in the PHA blend; a PHA blend of PHB with a Type 1 PHB copolymer and a Type 2 PHB copolymer where the PHB content is in the range of 10% to 90% by weight of the PHA in the PHA blend, where the Type 1 PHB copolymer content is in the range of 5% to 90% by weight of the PHA in the PHA blend and where the Type 2 PHB copolymer content is in the range of 5% to 90% by weight of the PHA in the PHA blend.

The PHA blend of PHB with a Type 1 PHB copolymer is a blend of PHB with PHB3HP where the PHB content in the PHA blend is in the range of 5% to 90% by weight of the PHA in the PHA blend and the 3HP content in the PHB3HP is in the range of 7% to 15% by weight of the PHB3HP.

The PHA blend of PHB with a Type 1 PHB copolymer is a blend of PHB with PHB3HV where the PHB content of the PHA blend is in the range of 5% to 90% by weight of the PHA in the PHA blend and the 3HV content in the PHB3HV is in the range of 4% to 22% by weight of the PHB3HV.

The PHA blend of PHB with a Type 1 PHB copolymer is a blend of PHB with PHB4HB where the PHB content of the PHA blend is in the range of 5% to 90% by weight of the PHA in the PHA blend and the 4HB content in the PHB4HB is in the range of 4% to 15% by weight of the PHB4HB.

The PHA blend of PHB with a Type 1 PHB copolymer is a blend of PHB with PHB4HV where the PHB content of the PHA blend is in the range of 5% to 90% by weight of the PHA in the PHA blend and the 4HV content in the PHB4HV is in the range of 4% to 15% by weight of the PHB4HV.

The PHA blend of PHB with a Type 1 PHB copolymer is a blend of PHB with PHB5HV where the PHB content of the PHA blend is in the range of 5% to 90% by weight of the PHA in the PHA blend and the 5HV content in the PHB5HV is in the range of 4% to 15% by weight of the PHB5HV.

The PHA blend of PHB with a Type 1 PHB copolymer is a blend of PHB with PHB3HH where the PHB content of the PHA blend is in the range of 5% to 90% by weight of the PHA in the PHA blend and the 3HH content in the PHB3HH is in the range of 4% to 15% by weight of the PHB3HH.

The PHA blend of PHB with a Type 1 PHB copolymer is a blend of PHB with PHB3HX where the PHB content of the PHA blend is in the range of 5% to 90% by weight of the PHA in the PHA blend and the 3HX content in the PHB3HX is in the range of 4% to 15% by weight of the PHB3HX.

The PHA blend is a blend of a Type 1 PHB copolymer selected from the group PHB3HV, PHB3HP, PHB4HB, PHBV, PHV4HV, PHB5HV, PHB3HH and PHB3HX with a second Type 1 PHB copolymer which is different from the first Type 1 PHB copolymer and is selected from the group PHB3HV, PHB3HP, PHB4HB, PHBV, PHV4HV, PHB5HV, PHB3HH and PHB3HX where the content of the First Type 1 PHB copolymer in the PHA blend is in the range of 10% to 90% by weight of the total PHA in the blend.

The PHA blend of PHB with a Type 2 PHB copolymer is a blend of PHB with PHB4HB where the PHB content in the PHA blend is in the range of 30% to 95% by weight of the PHA in the PHA blend and the 4HB content in the PHB4HB is in the range of 20% to 60% by weight of the PHB4HB.

The PHA blend of PHB with a Type 2 PHB copolymer is a blend of PHB with PHB5HV where the PHB content in the PHA blend is in the range of 30% to 95% by weight of the PHA in the PHA blend and the 5HV content in the PHB5HV is in the range of 20% to 60% by weight of the PHB5HV.

The PHA blend of PHB with a Type 2 PHB copolymer is a blend of PHB with PHB3HH where the PHB content in the PHA blend is in the range of 35% to 95% by weight of the PHA in the PHA blend and the 3HH content in the PHB3HH is in the range of 35% to 90% by weight of the PHB3HX.

The PHA blend of PHB with a Type 2 PHB copolymer is a blend of PHB with PHB3HX where the PHB content in the PHA blend is in the range of 30% to 95% by weight of the PHA in the PHA blend and the 3HX content in the PHB3HX is in the range of 35% to 90% by weight of the PHB3HX.

The PHA blend is a blend of PHB with a Type 1 PHB copolymer and a Type 2 PHB copolymer where the PHB content in the PHA blend is in the range of 10% to 90% by weight of the PHA in the PHA blend, the Type 1 PHB copolymer content of the PHA blend is in the range of 5% to 90% by weight of the PHA in the PHA blend and the Type 2 PHB copolymer content in the PHA blend is in the range of 5% to 90% by weight of the PHA in the PHA blend.

For example a PHA blend can have a PHB content in the PHA blend in the range of 10% to 90% by weight of the PHA in the PHA blend, a PHB3HV content in the PHA blend in the range 5% to 90% by weight of the PHA in the PHA blend, where the 3HV content in the PHB3HV is in the range of 3% to 22% by weight of the PHB3HV, and a PHBHX content in the PHA blend in the range of 5% to 90% by weight of the PHA in the PHA blend where the 3HX content in the PHBHX is in the range of 35% to 90% by weight of the PHBHX.

For example a PHA blend can have a PHB content in the PHA blend in the range of 10% to 90% by weight of the PHA in the PHA blend, a PHB3HV content in the PHA blend in the range 5% to 90% by weight of the PHA in the PHA blend, where the 3HV content in the PHB3HV is in the range of 3% to 22% by weight of the PHB3HV, and a PHB4HB content in the PHA blend in the range of 5% to 90% by weight of the PHA in the PHA blend where the 4HB content in the PHB4HB is in the range of 20% to 60% by weight of the PHB4HB.

For example a PHA blend can have a PHB content in the PHA blend in the range of 10% to 90% by weight of the PHA in the PHA blend, a PHB3HV content in the PHA blend in the range 5% to 90% by weight of the PHA in the PHA blend, where the 3HV content in the PHB3HV is in the range of 3% to 22% by weight of the PHB3HV, and a PHB5HV content in the PHA blend in the range of 5% to 90% by weight of the PHA in the PHA blend where the 5HV content in the PHB5HV is in the range of 20% to 60% by weight of the PHB5HV.

For example a PHA blend can have a PHB content in the PHA blend in the range of 10% to 90% by weight of the PHA in the PHA blend, a PHB4HB content in the PHA blend in the range 5% to 90% by weight of the PHA in the PHA blend, where the 4HB content in the PHB4HB is in the range of 4% to 15% by weight of the PHB4HB, and a PHB4HB content in the PHA blend in the range of 5% to 90% by weight of the PHA in the PHA blend where the 4HB content in the PHB4HB is in the range of 20% to 60% by weight of the PHB4HB.

For example a PHA blend can have a PHB content in the PHA blend in the range of 10% to 90% by weight of the PHA in the PHA blend, a PHB4HB content in the PHA blend in the range 5% to 90% by weight of the PHA in the PHA blend, where the 4HB content in the PHB4HB is in the range of 4% to 15% by weight of the PHB4HB, and a PHB5HV content in the PHA blend in the range of 5% to 90% by weight of the PHA in the PHA blend and where the 5HV content in the PHB5HV is in the range of 30% to 90% by weight of the PHB5HV.

For example a PHA blend can have a PHB content in the PHA blend in the range of 10% to 90% by weight of the PHA in the PHA blend, a PHB4HB content in the PHA blend in the range 5% to 90% by weight of the PHA in the PHA blend, where the 4HB content in the PHB4HB is in the range of 4% to 15% by weight of the PHB4HB, and a PHB3HX content in the PHA blend in the range of 5% to 90% by weight of the PHA in the PHA blend and where the 3HX content in the PHB3HX is in the range of 35% to 90% by weight of the PHB3HX.

For example a PHA blend can have a PHB content in the PHA blend in the range of 10% to 90% by weight of the PHA in the PHA blend, a PHB4HV content in the PHA blend in the range 5% to 90% by weight of the PHA in the PHA blend, where the 4HV content in the PHB4HV is in the range of 3% to 15% by weight of the PHB4HV, and a PHB5HV content in the PHA blend in the range of 5% to 90% by weight of the PHA in the PHA blend where the 5HV content in the PHB5HV is in the range of 30% to 90% by weight of the PHB5HV.

For example a PHA blend can have a PHB content in the PHA blend in the range of 10% to 90% by weight of the PHA in the PHA blend, a PHB3HH content in the PHA blend in the range 5% to 90% by weight of the PHA in the PHA blend, where the 3HH content in the PHB3HH is in the range of 3% to 15% by weight of the PHB3HH, and a PHB4HB content in the PHA blend in the range of 5% to 90% by weight of the PHA in the PHA blend where the 4HB content in the PHB4HB is in the range of 20% to 60% by weight of the PHB4HB.

For example a PHA blend can have a PHB content in the PHA blend in the range of 10% to 90% by weight of the PHA in the PHA blend, a PHB3HH content in the PHA blend in the range 5% to 90% by weight of the PHA in the PHA blend, where the 3HH content in the PHB3HH is in the range of 3% to 15% by weight of the PHB3HH, and a PHB5HV content in the PHA blend in the range of 5% to 90% by weight of the PHA in the PHA blend where the 5HV content in the PHB5HV is in the range of 20% to 60% by weight of the PHB5HV.

For example a PHA blend can have a PHB content in the PHA blend in the range of 10% to 90% by weight of the PHA in the PHA blend, a PHB3HH content in the PHA blend in the range 5% to 90% by weight of the PHA in the PHA blend, where the 3HH content in the PHB3HH is in the range of 3% to 15% by weight of the PHB3HH, and a PHB3HX content in the PHA blend in the range of 5% to 90% by weight of the PHA in the PHA blend where the 3HX content in the PHB3HX is in the range of 35% to 90% by weight of the PHB3HX.

For example a PHA blend can have a PHB content in the PHA blend in the range of 10% to 90% by weight of the PHA in the PHA blend, a PHB3HX content in the PHA blend in the range 5% to 90% by weight of the PHA in the PHA blend, where the 3HX content in the PHB3HX is in the range of 3% to 12% by weight of the PHB3HX, and a PHB3HX content in the PHA blend in the range of 5% to 90% by weight of the PHA in the PHA blend where the 3HX content in the PHB3HX is in the range of 35% to 90% by weight of the PHB3HX.

For example a PHA blend can have a PHB content in the PHA blend in the range of 10% to 90% by weight of the PHA in the PHA blend, a PHB3HX content in the PHA blend in the range 5% to 90% by weight of the PHA in the PHA blend, where the 3HX content in the PHB3HX is in the range of 3% to 12% by weight of the PHB3HX, and a PHB4HB content in the PHA blend in the range of 5% to 90% by weight of the PHA in the PHA blend where the 4HB content in the PHB4HB is in the range of 20% to 60% by weight of the PHB4HB.

For example a PHA blend can have a PHB content in the PHA blend in the range of 10% to 90% by weight of the PHA in the PHA blend, a PHB3HX content in the PHA blend in the range 5% to 90% by weight of the PHA in the PHA blend, where the 3HX content in the PHB3HX is in the range of 3% to 12% by weight of the PHB3HX, and a PHB5HV content in the PHA blend in the range of 5% to 90% by weight of the PHA in the PHA blend where the 5HV content in the PHB5HV is in the range of 20% to 60% by weight of the PHB5HV.

The PHA blend is a blend as disclosed in U.S. Pub. App. No. 2004/0220355, by Whitehouse, published Nov. 4, 2004, which is incorporated herein by reference in its entirety.

Microbial systems for producing the PHB copolymer PHBV are disclosed in U.S. Pat. No. 4,477,654 to Holmes. U.S. Pat. App. Pub. 2002/0164729, by Skraly and Sholl describes useful systems for producing the PHB copolymer PHB4HB. Useful processes for producing the PHB copolymer PHB3HH have been described (Lee et al., 2000, Biotechnology and Bioengineering 67:240-244; Park et al., 2001, Biomacromolecules 2:248-254). Processes for producing the PHB copolymers PHB3HX have been described by Matsusaki et al. (Biomacromolecules 2000, 1:17-22).

In determining the molecular weight techniques such as gel permeation chromatography (GPC) can be used. In the methodology, a polystyrene standard is utilized. The PHA can have a polystyrene equivalent weight average molecular weight (in daltons) of at least 500, at least 10,000, or at least 50,000 and/or less than 2,000,000, less than 1,000,000, less than 1,500,000, and less than 800,000. In certain embodiments, preferably, the PHAs generally have a weight-average molecular weight in the range of 100,000 to 700,000. For example, the molecular weight range for PHB and Type 1 PHB copolymers for use in this application are in the range of 400,000 daltons to 1.5 million daltons as determined by GPC method and the molecular weight range for Type 2 PHB copolymers for use in the application 100,000 to 1.5 million daltons.

In certain embodiments, the PHA can have a linear equivalent weight average molecular weight of from about 150,000 Daltons to about 500,000 Daltons and a polydispersity index of from about 2.5 to about 8.0. As used herein, weight average molecular weight and linear equivalent weight average molecular weight are determined by gel permeation chromatography, using, e.g., chloroform as both the eluent and diluent for the PHA samples. Calibration curves for determining molecular weights are generated using linear polystyrenes as molecular weight standards and a 'log MW vs elution volume' calibration method.

Blends of PHA with PBS or PBSA and Combinations Thereof

In certain embodiments, the polymers for use in the methods and compositions are blended in the presence of additives, branching agents and cross-linking agents to form compositions with improved properties. The percentages of PHA to PBS or PBSA are 5% to 95% by weight. In certain compositions of the invention, the percentage of PHA to PBS or PBSA of the total polymer compositions ranges from about 95% PHA to about 5% PBS or PBSA or about 50% PBS or PBSA to about 50% PHA. For example the PHA/PBS or PBSA ratio can be 95/5, 90/10, 85/15, 80/20, 75/25, 70/30, 65/35, 60/40, 55/45 or 50/50.

Branched Polyhydroxyalkanoates, Branched PBS or Branched PBSA

The term "branched polymer" refers to a PHA, PBS or PBSA with branching of the chain and/or cross-linking of two or more chains. Branching on side chains is also contemplated. Branching can be accomplished by various methods. Polyhydroxyalkanoate polymer described above can be branched by branching agents by free-radical-induced cross-linking of the polymer. In certain embodiment, the PHA is branched prior to combination in the method. In other embodiments, the PHA reacted with peroxide in the methods of the invention. The branching increases the melt strength of the polymer. Polyhydroxyalkanoate polymers can be branched in any of the ways described in U.S. U.S. Pat. Nos. 6,620,869, 7,208,535, 6,201,083, 6,156,852, 6,248,862, 6,201,083 and 6,096,810 all of which are incorporated herein by reference in their entirety.

The polymers of the invention can be branched according to any of the methods disclosed in WO 2010/008447 titled "Methods For Branching PHA Using Thermolysis" or WO 2010/008445 A2 titled "Branched PHA Compositions, Methods For Their Production, And Use In Applications," both of which were filed in English on Jun. 19, 2009, and designated the United States. These applications are incorporated by reference herein in their entirety.

The invention provides branched PHA copolymer blend compositions with PBS and/or PBSA that do not require the use of a compatibilizer for mixing and blending that other thermoplastic polymer blend compositions require. In these other compositions the compatibilizer is necessary to improve the properties of the blends and increase the compatibility of the polymer composition, especially immiscible polymers.

Branching Agents

The branching agents, also referred to a free radical initiator, for use in the compositions and method described herein include organic peroxides. Peroxides are reactive molecules, and can react with polymer molecules or previously branched polymers by removing a hydrogen atom from the polymer backbone, leaving behind a radical. Polymer molecules having such radicals on their backbone are free to combine with each other, creating branched polymer molecules. Branching agents are selected from any suitable initiator known in the art, such as peroxides, azo-derivatives (e.g., azo-nitriles), peresters, and peroxycarbonates. Suitable peroxides for use in the present invention include, but are not limited to, organic peroxides, for example dialkyl organic peroxides such as 2,5-dimethyl-2,5-di(t-butylperoxy) hexane, 2,5-bis(t-butylperoxy)-2,5-dimethylhexane (available from Azko Nobel as TRIGANOX® 101), 2,5-dimethyl-di(t-butylperoxy)hexyne-3, di-t-butyl peroxide, dicumyl peroxide, benzoyl peroxide, di-t-amyl peroxide, t-amylperoxy-2-ethylhexylcarbonate (TAEC), t-butyl cumyl peroxide, n-butyl-4,4-bis(t-butylperoxy)valerate, 1,1-di(t-butylperoxy)-3,3,5-trimethyl-cyclohexane, 1,1-bis(t-butylperoxy)-3,3,5-trimethylcyclohexane (CPK), 1,1-di(t-butylperoxy)cyclohexane, 1,1-di(t-amylperoxy)-cyclohexane, 2,2-di(t-butylperoxy)butane, ethyl-3,3-di(t-butylperoxy) butyrate, 2,2-di(t-amylperoxy)propane, ethyl-3,3-di(t-amylperoxy)butyrate, t-butylperoxy-acetate, t-amylperoxyacetate, t-butylperoxybenzoate, t-amylperoxybenzoate, di-t-butyldiperoxyphthalate, and the like. Combinations and mixtures of peroxides can also be used. Examples of free radical initiators include those mentioned herein, as well as those described in, e.g., Polymer Handbook, 3rd Ed., J. Brandrup & E. H. Immergut, John Wiley and Sons, 1989, Ch. 2. Irradiation (e.g., e-beam or gamma irradiation) can also be used to generate PHA branching.

The efficiency of branching and crosslinking of the polymer(s) can also be significantly enhanced by the dispersion of organic peroxides in a cross-linking agent, such as a polymerizable (i.e., reactive) plasticizers. The polymerizable plasticizer should contain a reactive functionality, such as a reactive unsaturated double bond, which increases the overall branching and crosslinking efficiency.

As discussed above, when peroxides decompose, they form very high energy radicals that can extract a hydrogen atom from the polymer backbone. These radicals have short half-lives, thereby limiting the population of branched molecules that is produced during the active time period.

Additives

In certain embodiments, various additives are added to the compositions. Examples of these additives include antioxidants, slip/antiblock agents, pigments, UV stabilizers, fillers, plasticizers, nucleating agents, talc, wax, calcium carbonate, and radical scavengers. Additionally, polyfunctional branching agents such as divinyl benzene, trially cyanurate and the like may be added. The branching agent and/or cross-linking agent is added to one or more of these for easier incorporation into the polymer. For instance, the branching agent and/or cross-linking agent is mixed with a plasticizer, e.g., a non-reactive plasticizer, e.g., a citric acid ester, and then compounded with the polymer under conditions to induce branching.

Optionally, additives are included in the thermoplastic compositions at a concentration of about 0.05 to about 20% by weight of the total composition. For example, the range is certain embodiments is about 0.05 to about 5% of the total composition. The additive is any compound known to those of skill in the art to be useful in the production of thermoplastics. Exemplary additives include, e.g., plasticizers (e.g., to increase flexibility of a thermoplastic composition), antioxidants (e.g., to protect the thermoplastic composition from degradation by ozone or oxygen), ultraviolet stabilizers (e.g., to protect against weathering), lubricants (e.g., to reduce friction), pigments (e.g., to add color to the thermoplastic composition), flame retardants, fillers, reinforcing, mold release, and antistatic agents. It is well within the skilled practitioner's abilities to determine whether an additive should be included in a thermoplastic composition and, if so, what additive and the amount that should be added to the composition.

The additive(s) can also be prepared as a masterbatch for example, by incorporating the additive(s) in a PHA blend and producing pellets of the resultant composition for addition to subsequent processing. In a masterbatch the concentration of the additive(s) is (are) higher than the final amount for the product to allow for proportionate mixing of the additive in the final composition.

In poly-3-hydroxybutyrate compositions, for example, plasticizers are often used to change the glass transition temperature and modulus of the composition, but surfactants may also be used. Lubricants may also be used, e.g., in injection molding applications. Plasticizers, surfactants and lubricants may all therefore be included in the overall composition.

In other embodiments, the blend includes one or more plasticizers. Examples of plasticizers include phthalic compounds (including, but not limited to, dimethyl phthalate, diethyl phthalate, dibutyl phthalate, dihexyl phthalate, di-n-octyl phthalate, di-2-ethylhexyl phthalate, diisooctyl phthalate, dicapryl phthalate, dinonyl phthalate, diisononyl phthalate, didecyl phthalate, diundecyl phthalate, dilauryl phthalate, ditridecyl phthalate, dibenzyl phthalate, dicyclohexyl phthalate, butyl benzyl phthalate, octyl decyl phthalate, butyl octyl phthalate, octyl benzyl phthalate, n-hexyl n-decyl phthalate, n-octyl phthalate, and n-decyl phthalate), phosphoric compounds (including, but not limited to, tricresyl phosphate, trioctyl phosphate, triphenyl phosphate, octyl diphenyl phosphate, cresyl diphenyl phosphate, and trichloroethyl phosphate), adipic compounds (including, but not limited to, dibutoxyethoxyethyl adipate (DBEEA), dioctyl adipate, diisooctyl adipate, di-n-octyl adipate, didecyl adipate, diisodecyl adipate, n-octyl n-decyl adipate, n-heptyl adipate, and n-nonyl adipate), sebacic compounds (including, but not limited to, dibutyl sebacate, dioctyl sebacate, diisooctyl sebacate, and butyl benzyl sebacate), azelaic compounds, citric compounds (including, but not limited to, triethyl citrate, acetyl triethyl citrate, tributyl citrate, acetyl tributyl citrate, and acetyl trioctyl citrate), glycolic compounds (including, but not limited to, methyl phthalyl ethyl glycolate, ethyl phthalyl ethyl glycolate, and butyl phthalyl ethyl glycolate), trimellitic compounds (including, but not limited to, trioctyl trimellitate and tri-n-octyl n-decyl trimellitate), phthalic isomer compounds (including, but not limited to, dioctyl isophthalate and dioctyl terephthalate), ricinoleic compounds (including, but not limited to, methyl acetyl, recinoleate and butyl acetyl recinoleate), polyester compounds (including, but not limited to reaction products of diols selected from butane diol, ethylene glycol, propane 1,2 diol, propane 1,3 diol, polyethylene glycol, glycerol, diacids selected from adipic acid, succinic acid, succinic anhydride and hydroxyacids such as hydroxystearic acid, epoxidized soy bean oil, chlorinated paraffins, chlorinated fatty acid esters, fatty acid compounds, plant oils, pigments, and acrylic compounds. The plasticizers may be used either alone respectively or in combinations with each other.

In certain embodiments, the compositions and methods of the invention include one or more surfactants. Surfactants are generally used to de-dust, lubricate, reduce surface tension, and/or densify. Examples of surfactants include, but are not limited to mineral oil, castor oil, and soybean oil. One mineral oil surfactant is DRAKEOL® 34 surfactant, available from Penreco (Dickinson, Tex., USA). MAXSPERSE® W-6000 surfactant and W-3000 solid surfactants are available from Chemax Polymer Additives (Piedmont, S.C., USA). Non-ionic surfactants with HLB values ranging from about 2 to about 16 can be used, examples being TWEEN-20 surfactant, TWEEN-65 surfactant, Span-40 surfactant and Span 85 surfactant.

Anionic surfactants include: aliphatic carboxylic acids such as lauric acid, myristic acid, palmitic acid, stearic acid, and oleic acid; fatty acid soaps such as sodium salts or potassium salts of the above aliphatic carboxylic acids; N-acyl-N-methylglycine salts, N-acyl-N-methyl-beta-alanine salts, N-acylglutamic acid salts, polyoxyethylene alkyl ether carboxylic acid salts, acylated peptides, alkylbenzenesulfonic acid salts, alkylnaphthalenesulfonic acid salts, naphthalenesulfonic acid salt-formalin polycondensation products, melaminesulfonic acid salt-formalin polycondensation products, dialkylsulfosuccinic acid ester salts, alkyl sulfosuccinate disalts, polyoxyethylene alkylsulfosuccinic acid disalts, alkylsulfoacetic acid salts, (alpha-olefinsulfonic acid salts, N-acylmethyltaurine salts, sodium dimethyl 5-sulfoisophthalate, sulfated oil, higher alcohol sulfuric acid ester salts, polyoxyethylene alkyl ether sulfuric acid salts, secondary higher alcohol ethoxysulfates, polyoxyethylene alkyl phenyl ether sulfuric acid salts, monoglysulfate, sulfuric acid ester salts of fatty acid alkylolamides, polyoxyethylene alkyl ether phosphoric acid salts, polyoxyethylene alkyl phenyl ether phosphoric acid salts, alkyl phosphoric acid salts, sodium alkylamine oxide bistridecylsulfosuccinates, sodium dioctylsulfosuccinate, sodium dihexylsulfosuccinate, sodium dicyclohexylsulfosuccinate, sodium diamylsulfosuccinate, sodium diisobutylsulfosuccinate, alkylamine guanidine polyoxyethanol, disodium sulfosuccinate ethoxylated alcohol half esters, disodium sulfosuccinate ethoxylated nonylphenol half esters, disodium isodecylsulfosuccinate, disodium N-octadecylsulfosuccinamide, tetrasodium N-(1,2-dicarboxyethyl)-N-octadecylsulfosuccinamide, disodium mono- or didodecyldiphenyl oxide disulfonates, sodium diisopropylnaphthalenesulfonate, and neutralized condensed products from sodium naphthalenesulfonate.

One or more lubricants can also be added to the compositions and methods of the invention. Lubricants are normally used to reduce sticking to hot metal surfaces during processing and can include polyethylene, paraffin oils, and paraffin waxes in combination with metal stearates (e.g., zinc sterate). Other lubricants include stearic acid, amide waxes, ester waxes, metal carboxylates, and carboxylic acids. Lubricants are normally added to polymers in the range of about 0.1 percent to about 1 percent by weight, generally from about 0.7 percent to about 0.8 percent by weight of the compound. Solid lubricants is warmed and melted before or during processing of the blend.

One or more anti-microbial agents can also be added to the compositions and methods of the invention. An anti-microbial is a substance that kills or inhibits the growth of microorganisms such as bacteria, fungi, or protozoans, as well as destroying viruses. Antimicrobial drugs either kill microbes (microbicidal) or prevent the growth of microbes (microbistatic). A wide range of chemical and natural compounds are used as antimicrobials, including but not limited to: organic acids, essential oils, cations and elements (e.g., colloidal silver). Commercial examples include but are not limited to PolySept® Z microbial, UDA and AGION®.

PolySept® Z microbial (available from PolyChem Alloy) is a organic salt based, non-migratory antimicrobial. "UDA" is *Urtica dioica* agglutinin. AGION® antimicrobial is a silver compound. AMICAL® 48 silver is diiodomethyl p-tolyl sulfone. In certain aspects the antimicrobial agent slows down degradation of the composition.

In film applications of the compositions and methods described herein, anti-lock masterbatch is also added. A suitable example is a slip anti-block masterbatch mixture of erucamide (20% by weight) diatomaceous earth (15% by weight) nucleant masterbatch (3% by weight), pelleted into PHA (62% by weight).

Cross-Linking Agents

Cross-linking agent, also referred to as co-agents, used in the methods and compositions of the invention are cross-linking agents comprising two or more reactive functional groups such as epoxides or double bonds. These cross-linking agents modify the properties of the polymer. These properties include, but are not limited to, melt strength or toughness. One type of cross-linking agent is an "epoxy functional compound." As used herein, "epoxy functional compound" is meant to include compounds with two or more epoxide groups capable of increasing the melt strength of polyhydroxyalkanoate polymers by branching, e.g., end branching as described above.

When an epoxy functional compound is used as the cross-linking agent in the disclosed methods, a branching agent is optional. As such one embodiment of the invention is a method of branching a starting polyhydroxyalkanoate polymer (PHA), comprising reacting a starting PHA with an epoxy functional compound. Alternatively, the invention is a method of branching a starting polyhydroxyalkanoate polymer, comprising reacting a starting PHA, a branching agent and an epoxy functional compound. Alternatively, the invention is a method of branching a starting polyhydroxyalkanoate polymer, comprising reacting a starting PHA, and an epoxy functional compound in the absence of a branching agent. Such epoxy functional compounds can include epoxy-functional, styrene-acrylic polymers (such as, but not limited to, e.g., Joncryl® ADR-4368 (BASF), or MP-40 (Kaneka)), acrylic and/or polyolefin copolymers and oligomers containing glycidyl groups incorporated as side chains (such as, but not limited to, e.g., LOTADER® (Arkema), poly(ethylene-glycidyl methacrylate-co-methacrylate)), and epoxidized oils (such as, but not limited to, e.g., epoxidized soybean, olive, linseed, palm, peanut, coconut, seaweed, cod liver oils, or mixtures thereof, e.g., Merginat® ESBO (Hobum, Hamburg, Germany) and EDENOL® B 316 (Cognis, Dusseldorf, Germany)).

For example, reactive acrylics or functional acrylics cross-linking agents are used to increase the molecular weight of the polymer in the branched polymer compositions described herein. Such cross-linking agents are sold commercially. BASF, for instance, sells multiple compounds under the trade name "Joncryl®," which are described in U.S. Pat. No. 6,984,694 to Blasius et al., "Oligomeric chain extenders for processing, post-processing and recycling of condensation polymers, synthesis, compositions and applications", incorporated herein by reference in its entirety. One such compound is Joncryl® ADR-4368CS, which is styrene glycidyl methacrylate and is discussed below. Another is MP-40 (Kaneka). And still another is Petra line from Honeywell, see for example, U.S. Pat. No. 5,723,730. Such polymers are often used in plastic recycling (e.g., in recycling of polyethylene terephthalate) to increase the molecular weight (or to mimic the increase of molecular weight) of the polymer being recycled. Such polymers often have the general structure:

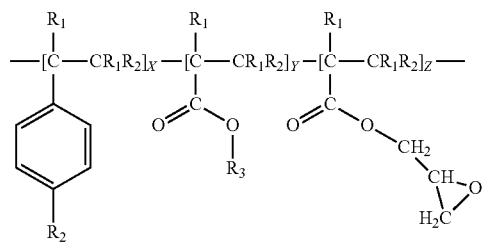

R₁ and R₂ are H or alkyl
R₃ is alkyl
x and y are 1-20
z is 2-20

E.I. du Pont de Nemours & Company sells multiple reactive compounds under the trade name Elvaloy®, which are ethylene copolymers, such as acrylate copolymers, elastomeric terpolymers, and other copolymers. One such compound is Elvaloy PTW, which is a copolymer of ethylene-n-butyl acrylate and glycidyl methacrylate. Omnova sells similar compounds under the trade names "SX64053," "SX64055," and "SX64056." Other entities also supply such compounds commercially.

Specific polyfunctional polymeric compounds with reactive epoxy functional groups are the styrene-acrylic copolymers. These materials are based on oligomers with styrene and acrylate building blocks that have glycidyl groups incorporated as side chains. A high number of epoxy groups per oligomer chain are used, for example 5, greater than 10, or greater than 20. These polymeric materials generally have a molecular weight greater than 3000, specifically greater than 4000, and more specifically greater than 6000. These are commercially available from S.C. Johnson Polymer, LLC (now owned by BASF) under the trade name Joncryl® ADR 4368 material. Other types of polyfunctional polymer materials with multiple epoxy groups are acrylic and/or polyolefin copolymers and oligomers containing glycidyl groups incorporated as side chains. A further example of such a polyfunctional carboxy-reactive material is a co- or ter-polymer including units of ethylene and glycidyl methacrylate (GMA), available under the trade name LOTADER® resin, sold by Arkema. These materials can further comprise methacrylate units that are not glycidyl. An example of this type is poly(ethylene-glycidyl methacrylate-co-methacrylate).

Fatty acid esters or naturally occurring oils containing epoxy groups (epoxidized) can also be used. Examples of naturally occurring oils are olive oil, linseed oil, soybean oil, palm oil, peanut oil, coconut oil, seaweed oil, cod liver oil, or a mixture of these compounds. Particular preference is given to epoxidized soybean oil (e.g., Merginat® ESBO from Hobum, Hamburg, or EDENOL® B 316 from Cognis, Dusseldorf), but others may also be used.

Another type of cross-linking agent are agents with two or more double bonds. Cross-linking agents with two or more double bond cross-link PHAs by after reacting at the double bonds. Examples of these include: diallyl phthalate, pentaerythritol tetraacrylate, trimethylolpropane triacrylate, pentaerythritol triacrylate, dipentaerythritol pentaacrylate, diethylene glycol dimethacrylate, bis(2-methacryloxyethyl) phosphate.

In general, it appears that compounds with terminal epoxides may perform better than those with epoxide groups located elsewhere on the molecule.

Compounds having a relatively high number of end groups are the most desirable. Molecular weight may also play a role in this regard, and compounds with higher numbers of end groups relative to their molecular weight (e.g., the JONCRYL®s are in the 3000-4000 g/mol range) are likely to perform better than compounds with fewer end groups relative to their molecular weight (e.g., the Omnova products have molecular weights in the 100,000-800,000 g/mol range).

Nucleating Agents

For instance, an optional nucleating agent is added to the composition to aid in its crystallization. Nucleating agents for various polymers are simple substances, metal compounds including composite oxides, for example, carbon black, calcium carbonate, synthesized silicic acid and salts, silica, zinc white, clay, kaolin, basic magnesium carbonate, mica, talc, quartz powder, diatomite, dolomite powder, titanium oxide, zinc oxide, antimony oxide, barium sulfate, calcium sulfate, alumina, calcium silicate, metal salts of organophosphates, and boron nitride; low-molecular organic compounds having a metal carboxylate group, for example, metal salts of such as octylic acid, toluic acid, heptanoic acid, pelargonic acid, lauric acid, myristic acid, palmitic acid, stearic acid, behenic acid, cerotic acid, montanic acid, melissic acid, benzoic acid, p-tert-butylbenzoic acid, terephthalic acid, terephthalic acid monomethyl ester, isophthalic acid, and isophthalic acid monomethyl ester; high-molecular organic compounds having a metal carboxylate group, for example, metal salts of such as: carboxyl-group-containing polyethylene obtained by oxidation of polyethylene; carboxyl-group-containing polypropylene obtained by oxidation of polypropylene; copolymers of olefins, such as ethylene, propylene and butene-1, with acrylic or methacrylic acid; copolymers of styrene with acrylic or methacrylic acid; copolymers of olefins with maleic anhydride; and copolymers of styrene with maleic anhydride; high-molecular organic compounds, for example: alpha-olefins branched at their 3-position carbon atom and having no fewer than 5 carbon atoms, such as 3,3 dimethylbutene-1,3-methylbutene-1,3-methylpentene-1,3-methylhexene-1, and 3,5,5-trimethylhexene-1; polymers of vinylcycloalkanes such as vinylcyclopentane, vinylcyclohexane, and vinylnorbomane; polyalkylene glycols such as polyethylene glycol and polypropylene glycol; poly(glycolic acid); cellulose; cellulose esters; and cellulose ethers; phosphoric or phosphorous acid and its metal salts, such as diphenyl phosphate, diphenyl phosphite, metal salts of bis(4-tert-butylphenyl)phosphate, and methylene bis-(2,4-tert-butylphenyl)phosphate; sorbitol derivatives such as bis(p-methylbenzylidene) sorbitol and bis(p-ethylbenzylidene) sorbitol; and thioglycolic anhydride, p-toluenesulfonic acid and its metal salts. The above nucleating agents may be used either alone or in combinations with each other. In particular embodiments, the nucleating agent is cyanuric acid. In certain embodiments, the nucleating agent can also be another polymer (e.g., polymeric nucleating agents such as PHB).

In certain embodiments, the nucleating agent is selected from: cyanuric acid, carbon black, mica talc, silica, boron nitride, clay, calcium carbonate, synthesized silicic acid and salts, metal salts of organophosphates, and kaolin. In particular embodiments, the nucleating agent is cyanuric acid.

In various embodiments, where the nucleating agent is dispersed in a liquid carrier, the liquid carrier is a plasticizer, e.g., a citric compound or an adipic compound, e.g., acetylcitrate tributyrate (CITROFLEX® A4 plasticizer, Vertellus, Inc., High Point, N.C.), or DBEEA (dibutoxyethoxyethyl adipate), a surfactant, e.g., Triton X-100 surfactant, TWEEN-20 surfactant, TWEEN-65 surfactant, Span-40 surfactant or Span 85 surfactant, a lubricant, a volatile liquid, e.g., chloroform, heptane, or pentane, an organic liquid or water.

In other embodiments, the nucleating agent is aluminum hydroxy diphosphate or a compound comprising a nitrogen-containing heteroaromatic core. The nitrogen-containing heteroaromatic core is pyridine, pyrimidine, pyrazine, pyridazine, triazine, or imidazole.

In particular embodiments, the nucleating agent can include aluminum hydroxy diphosphate or a compound comprising a nitrogen-containing heteroaromatic core. The nitrogen-containing heteroaromatic core is pyridine, pyrimidine, pyrazine, pyridazine, triazine, or imidazole. The nucleant can have a chemical formula selected from the group consisting of

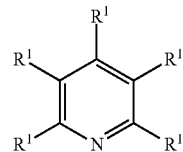

Formula 1

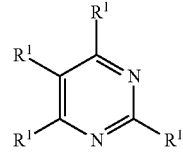

Formula 2

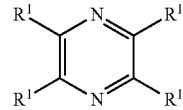

Formula 3

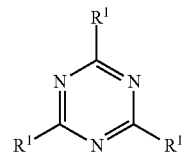

Formula 4

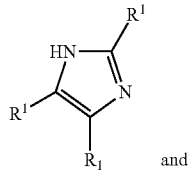

and

Formula 5

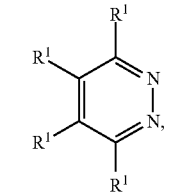

Formula 6 and combinations thereof, wherein each R1 is independently H, NR2R2, OR2, SR2, SOR2, SO2R2, CN, COR2, CO2R2, CONR2R2, NO2, F, Cl, Br, or I; and each R2 is independently H or C1-C6 alkyl.

The nucleating agent can be a nucleating agent as described in U.S. Pat. App. Pub. 2005/0209377, by Allen Padwa, which is herein incorporated by reference in its entirety.

Another nucleating agent for use in the compositions and methods described herein are milled as described in WO 2009/129499 titled "Nucleating Agents for Polyhydroxyalkanoates," which was published in English and designated the United States, which is herein incorporated by reference in its entirety. Briefly, the nucleating agent is milled in a liquid carrier until at least 5% of the cumulative solid volume of the nucleating agent exists as particles with a particle size of 5 microns or less. The liquid carrier allows the nucleating agent to be wet milled. In other embodiments, the nucleating agent is milled in liquid carrier until at least 10% of the cumulative solid volume, at least 20% of the cumulative solid volume, at least 30% or at least 40%-50% of the nucleating agent can exist as particles with a particle size of 5 microns or less, 2 microns or less or 1 micron or less. In alternative embodiments, the nucleating agents is milled by other methods, such as jet milling and the like. Additionally, other methods is utilized that reduce the particle size.

The cumulative solid volume of particles is the combined volume of the particles in dry form in the absence of any other substance. The cumulative solid volume of the particles is determined by determining the volume of the particles before dispersing them in a polymer or liquid carrier by, for example, pouring them dry into a graduated cylinder or other suitable device for measuring volume. Alternatively, cumulative solid volume is determined by light scattering.

Application of the Compositions

For the fabrication of useful articles, the compositions described herein are processed preferably at a temperature above the crystalline melting point of the polymers but below the decomposition point of any of the ingredients (e.g., the additives described above, with the exception of some branching agents) of the polymeric composition. While in heat plasticized condition, the polymeric composition is processed into a desired shape, and subsequently cooled to set the shape and induce crystallization. Such shapes can include, but are not limited to, a fiber, filament, film, sheet, rod, tube, bottle, or other shape. Such processing is performed using any art-known technique, such as, but not limited to, extrusion, injection molding, compression molding, blowing or blow molding (e.g., blown film, blowing of foam), calendaring, rotational molding, casting (e.g., cast sheet, cast film), or thermoforming.

The compositions are used to create, without limitation, a wide variety of useful products, e.g., automotive, consumer durable, construction, electrical, medical, and packaging products. For instance, the polymeric compositions is used to make, without limitation, films (e.g., packaging films, agricultural film, mulch film, erosion control, hay bale wrap, slit film, food wrap, pallet wrap, protective automobile and appliance wrap, etc.), golf tees, caps and closures, agricultural supports and stakes, paper and board coatings (e.g., for cups, plates, boxes, etc.), thermoformed products (e.g., trays, containers, lids, yoghurt pots, cup lids, plant pots, noodle bowls, moldings, etc.), housings (e.g., for electronics items, e.g., cell phones, PDA cases, music player cases, computer cases and the like), bags (e.g., trash bags, grocery bags, food bags, compost bags, etc.), hygiene articles (e.g., diapers, feminine hygiene products, incontinence products, disposable wipes, etc.), coatings for pelleted products (e.g., pelleted fertilizer, herbicides, pesticides, seeds, etc.), injection molded articles (writing instruments, utensils, disk cases, etc.), solution and spun fibers and melt blown fabrics and non-wovens (threads, yarns, wipes, wadding, disposable absorbent articles), blow moldings (deep containers, bottles, etc.) and foamed articles (cups, bowls, plates, packaging, etc.).

Thermoforming is a process that uses films or sheets of thermoplastic. The polymeric composition is processed into a film or sheet. The sheet of polymer is then placed in an oven and heated. When soft enough to be formed it is transferred to a mold and formed into a shape.

During thermoforming, when the softening point of a semi-crystalline polymer is reached, the polymer sheet begins to sag. The window between softening and droop is usually narrow. It can therefore be difficult to move the softened polymer sheet to the mold quickly enough. Branching the polymer can be used to increase the melt strength of the polymer so that the sheet maintains is more readily processed and maintains its structural integrity. Measuring the sag of a sample piece of polymer when it is heated is therefore a way to measure the relative size of this processing window for thermoforming.

Because the composition described herein have increased melt strength and increased processability, they are easier to convert to film or sheet form. They are therefore excellent candidates for thermoforming. Molded products include a number of different product types and, for example, including products such as disposable spoons, forks and knives, tubs, bowls, lids, cup lids, yogurt cups, and other containers, bottles and bottle-like containers, etc.

The compositions described herein can be processed into films of varying thickness, for example, films of uniform thickness ranging from 10-200 microns, for example, 20-75 microns, 75 to 150 microns, or from 50-100 microns. Film layers can additionally be stacked to form multilayer films of the same or varying thicknesses or compositions. For example, a film can comprise two, three, four or more layers, where the layers can include one or more layers of a composition of the invention combined with other polymer layers, such as PHA layers, or PLA layers and the like.

Blow molding, which is similar to thermoforming and is used to produce deep draw products such as bottles and similar products with deep interiors, also benefits from the increased elasticity and melt strength and reduced sag of the polymer compositions described herein.

Articles made from the compositions can be annealed according to any of the methods disclosed in WO 2010/008445, and titled "Branched PHA Compositions, Methods For Their Production, And Use In Applications," which was filed in English and designated the United States. This application is incorporated by reference herein in its entirety.

The compositions described herein are provided in any suitable form convenient for an intended application. For example, the composition is provided in pellet for subsequent production of films, coatings, moldings or other articles, or the films, coatings, moldings and other articles.

The specific examples below are to be construed as merely illustrative, and not limitative of the remainder of the disclosure in any way whatsoever. Without further elaboration, it is believed that one skilled in the art can, based on the description herein, utilize the present invention to its fullest extent. All publications cited herein are hereby incorporated by reference in their entirety.

EXAMPLES

Experimental Methods

Measurement of Torsional Melt Rheology (G')

All oscillatory rheology measurements were performed using a TA Instruments AR2000 rheometer employing a strain amplitude of 1%. First, pellets (or powder) were molded into 25 mm diameter discs that were about 1200 microns in thickness. The disc specimens were molded in a compression molder set at about 165° C., with the molding time of about 30 seconds. These molded discs were then placed in between the 25 mm parallel plates of the AR2000 rheometer, equilibrated at 180° C., and subsequently cooled to 160° C. for the frequency sweep test. A gap of 800-900 microns was used, depending on the normal forces exerted by the polymer. The melt density of PHB was determined to be about 1.10 g/cm3 at 160° C.; this value was used in all the calculations.

Specifically, the specimen disc is placed between the platens of the parallel plate rheometer set at 180° C. After the final gap is attained, excess material from the sides of the platens is scraped. The specimen is then cooled to 160° C. where the frequency scan (from 625 rad/s to 0.10 rad/s) is then performed; frequencies lower than 0.1 rad/s are avoided because of considerable degradation over the long time it takes for these lower frequency measurements. The specimen loading, gap adjustment and excess trimming, all carried out with the platens set at 180° C., takes about 2½ minutes. This is controlled to within ±10 seconds to minimize variability and sample degradation. Cooling from 180° C. to 160° C. (test temperature) is accomplished in about four minutes. Exposure to 180° C. ensures a completely molten polymer, while testing at 160° C. ensures minimal degradation during measurement.

During the frequency sweep performed at 160° C., the following data are collected as a function of measurement frequency: |n*| or complex viscosity, G' or elastic modulus (elastic or solid-like contribution to the viscosity) and G" or loss modulus (viscous or liquid-like contribution to the viscosity). For purposes of simplicity, we will use G' measured at an imposed frequency of 0.25 rad/s as a measure of "melt strength". Higher G' translates to higher melt strength.

Measurement of Capillary Stability

The Capillary Stability was measured by performing steady shear experiments at 180° C. using a Kayness Galaxy V Capillary Rheometer. The die employed in the above capillary measurements was about 1.0 mm in diameter and about 30 mm in length. The capillary rheometer is a controlled shear rate device, and was operated at three shear rates (1,000 sec-1, 100 sec-1, and 10 sec-1), repeated three times, for a total of nine (9) data points collected over 17 minutes. The pellets (~10 grams) were preheated at 180° C. for 240 seconds (4 minutes) before the start of the test. The nine test data points are collected without any delay between them.

Because PHB copolymers undergo chain scission reactions in the melt that lead to a continuous decrease in melt viscosity as a function of time, the above test protocol generates data as shown below (see FIG. 1 for a representative PHB copolymer).

When log (Apparent Viscosity) is plotted as a function of time, a systematic decrease in viscosity is evident; this trend is also noted to be quite linear. The slope of the "Apparent Viscosity Versus Time" fit yields is an indication of melt stability (according to ASTM D3835). In this report, we use this slope for data collected at a shear rate of 100 s-1 as an indication of melt stability and this slope is referred to as the "Capillary Stability".

Measurement of Melt Crystallization

A Perkin Elmer DSC is used to characterize the non-isothermal melt-crystallization kinetics of the subject PHB copolymers. In this test, the specimen (cut from a disc compression molded at 165° C. for one minute) is placed and crimped in the DSC sample pan. This test specimen is then exposed to 200° C. for one minute to melt all of the crystals; it is then cooled to 160° C. at 40° C./min and maintained at 160° C. for about 1 minute. The specimen is then cooled to −50° C. at a rate of about 10° C./min. As the polymer undergoes crystallization, an exothermic peak in the "heat flow versus temperature" trace becomes evident. The peak-temperature of this exotherm is noted as the crystallization temperature or Tmc. A higher Tmc generally means faster crystallization kinetics.

Measurement of Mechanical Properties of Blown Film

The Elmendorf resistance to tear propagation was measured according to ASTM D1922-06. The tear propagation resistance of the film was measured in two directions, along the flow exiting the die ("machine direction tear" or "MD Tear") and also perpendicular to the polymer flow exiting the die ("transverse direction tear" or "TD Tear").

The dart impact strength was measured according to ASTM D1709-04.

The tensile properties (i.e., modulus, strength, elongation to break) were measured according to ASTM D882-02.

Measurement of the Mechanical Properties of Injection Molded Articles

Tensile properties of injection molded articles were measured according to ASTM D638-03.

Flexural properties of injection molded articles were measured according to ASTM D790-03.

Notched Izod properties of injection molded articles were measured according to ASTM D256-06.

Soil Biodegradation Test Method

The biodegradation rate of the subject films was characterized and quantified using a soil burial test. In this test, a small piece of the film specimen (~5 cm by 9 cm) was buried under 1-2 inches of soil in a plastic container inside a room where the temperature was maintained between 20-25 C. The soil was a top soil obtained from a local commercial vegetable farm in Massachusetts. The soil moisture content was maintained by watering regularly (7 grams of water was added to about 100 grams of soil once every three days). Since the container was not covered, the moisture content in the soil dropped from about 9-10% to 1-2% in three days. The buried film specimens are retrieved on a weekly basis (different specimen for each week of elapsed time buried in soil); the retrieved specimens are first washed with water to remove dirt and then dried with paper towels. The dried film specimens (or fragments, if considerable biodegradation had already occurred) are weighed. The measured weight loss quantifies the rate of biodegradation for the different formulations. In Examples presented in this application, the film specimen geometry is kept constant; consequently, the absolute value of the weight loss provides an accurate depiction of the biodegradation kinetics. A higher weight loss translates to faster biodegradation.

Example 1

Compositions Containing PHA Blends and Poly(Butylene Succinate)

In this Example, compositions that include a PHA copolymer and PBS (BIONOLLE® 1001 from Showa Highpolymer Co., Ltd., Japan) were prepared by dry-blending the components at a pre-determined ratio and subjecting this mixture to twin-screw extrusion in a ¾ inch Brabender extruder operated at about 50 rpm and a melt temperature of about 180° C. The formulations are indicated in the table below.

TABLE 1

| Compositions containing PHA blend and PBS | | | | | | | | | |
|---|---|---|---|---|---|---|---|---|---|
| | 1 | 2 | 3 | 4 | 5 | 6 | 7 | 8 | 9 |
| Formulation | | | | | | | | | |
| PHA Blend (wt %) | 97 | 92 | 87 | 77 | 62 | 47 | 32 | 17 | 0 |
| Nuc. MB (wt %) | 3 | 3 | 3 | 3 | 3 | 3 | 3 | 3 | 0 |
| PBS (wt %) | 0 | 5 | 10 | 20 | 35 | 50 | 65 | 80 | 100 |
| Total | 100 | 100 | 100 | 100 | 100 | 100 | 100 | 100 | 100 |
| Data: | | | | | | | | | |
| G' (@ 0.25 rad/s) | 51 | 74 | 48 | 103 | 170 | 202 | 363 | 659 | 1288 |
| Eta* (@ 0.25 rad/s) | 2937 | 3122 | 2517 | 2846 | 3761 | 4179 | 5119 | 7081 | 12920 |
| Capillary Stability | −0.10 | −0.08 | −0.08 | −0.09 | −0.08 | −0.10 | −0.09 | −0.06 | −0.02 |
| Tmc (PHA Blend) | 113.4 | 107.9 | 108.2 | 107.9 | 103.2 | 100.4 | 102.0 | 99.1 | — |
| Tmc (PBS) | — | nd | nd | nd | 85.6 | 85.3 | 87.2 | 86.2 | 87.1 |

"nd" = not detectable

The PHA blend was composed of about 58-62% homopolymer of 3-hydroxybutanoic acid, and about 38-42% copolymer of 3-hydroxybutanoic acid and 4-hydroxybutanoic acid, where the 4-hydroxybutanoic acid is approximately 8-14% weight percent. The nucleating masterbatch ("Nuc. MB") was cyanuric acid that had been previously compounded at a rate of 33% (by weight) into a base resin of 3-hydroxybutanoic acid and 4-hydroxybutanoic acid, and pelleted. The PBS was BIONOLLE® 1001 polymer (Showa Highpolymer Co., Ltd., Japan).

Figure 2:
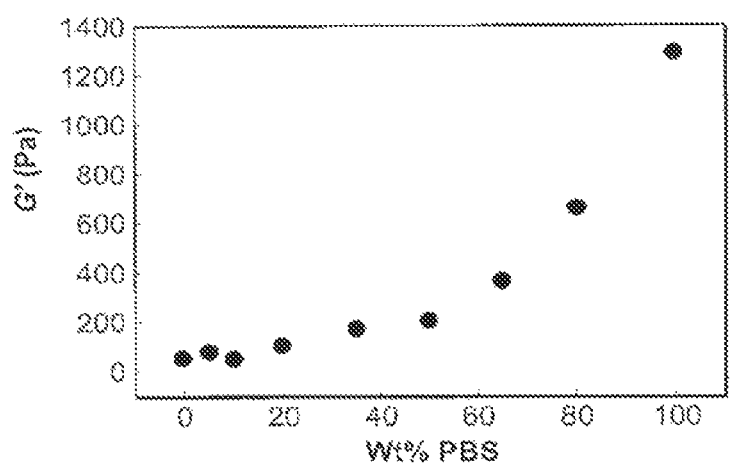
FIG. 2 is a plot showing G' of vs. Wt % PBS.
Figure 3:
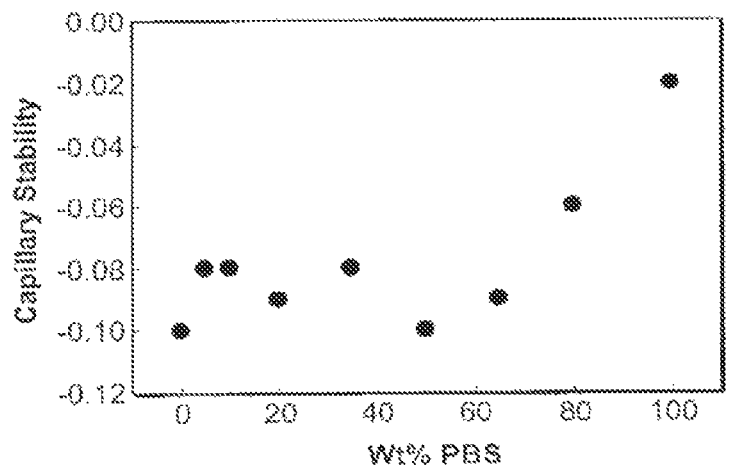
FIG. 3 is a plot showing capillary stability vs. Wt % PBS.

Formulation 1 is the PHA control (no PBS). Formulation 2 is the PBS control (no PHA blend). The PHA control displays considerably lower melt viscosity (Eta*) and melt strength (G') compared to PBS. The melt stability (capillary stability) of the PHA is also worse compared to that of PBS. G' and capillary stability for the formulations are plotted as a function of formulation composition below. These parameters appear to be quite independent of formulation composition when PBS is the minor component and strongly dependent on formulation composition when PBS is the major component. In other words, the increase in G' with increasing levels of the higher melt strength PBS in the blend is very modest up to a formulation composition of about 50% PBS. As the concentration of PBS in these formulations is increased further, the increase in G' becomes significant as it approaches the G' of the pure PBS. In terms of capillary stability, PBS is considerably more stable compared to the pure PHA. The capillary stability of all formulations with PHA as the major component is very similar to that of the PHA control; however, when PBS becomes the major component, a systematic improvement in stability is evident with increasing levels of PBS. The crystallization rate (Tmc) of PHA decreases slightly in the presence of PBS; however, Tmc does not appear to depend on PBS concentration. All of the data for this particular formulation series indicate a multi-phase melt with very little miscibility between the PHA and PBS. See FIG. 2 and FIG. 3.

Example 2

Compositions Containing PHA Blends and Polybutylene Succinate Adipate

In this Example, formulations of a PHA copolymer and PBSA (BIONOLLE® 3001 polymer from Showa Highpolymer Co., Ltd., Japan) were prepared by dry-blending the components at a pre-determined ratio and subjecting this mixture to twin-screw extrusion in a ¾ inch Brabender extruder operated at about 50 rpm and a melt temperature of about 180° C. The compositions of the formulations are indicated in the table below.

TABLE 2

| Compositions containing PHA blend and PBSA | | | | | | | | | |
|---|---|---|---|---|---|---|---|---|---|
| | 1 | 2 | 3 | 4 | 5 | 6 | 7 | 8 | 9 |
| Formulation | | | | | | | | | |
| PHABlend (wt %) | 97 | 92 | 87 | 77 | 62 | 47 | 32 | 17 | 0 |
| Nuc. MB (wt %) | 3 | 3 | 3 | 3 | 3 | 3 | 3 | 3 | 0 |
| PBSA (wt %) | 0 | 5 | 10 | 20 | 35 | 50 | 65 | 80 | 100 |
| Total | 100 | 100 | 100 | 100 | 100 | 100 | 100 | 100 | 100 |
| Data: | | | | | | | | | |
| G' (@0.25 rad/s) | 51 | 64 | 72 | 108 | 133 | 133 | 300 | 1009 | 1383 |

TABLE 2-continued

Compositions containing PHA blend and PBSA

|  | 1 | 2 | 3 | 4 | 5 | 6 | 7 | 8 | 9 |
|---|---|---|---|---|---|---|---|---|---|
| Eta* (@ 0.25 rad/s) | 2937 | 2931 | 2834 | 2787 | 3274 | 3392 | 4902 | 9284 | 13560 |
| Capillary Stability | −0.10 | −0.10 | −0.09 | −0.09 | −0.11 | −0.11 | −0.08 | −0.04 | −0.02 |
| Tmc (PHA Blend) | 113.4 | 108.4 | 109.0 | 107.3 | 103.6 | 103.0 | 100.0 | nd | — |
| Tmc (PBSA) | — | nd | nd | nd | 65.0 | 63.3 | 62.3 | 62.3 | 65.0 |

"nd" = not detectable

The PHA blend was composed of about 58-62% homo-polymer of 3-hydroxybutanoic acid, and about 38-42% co-polymer of 3-hydroxybutanoic acid and 4-hydroxybutanoic acid, where the 4-hydroxybutanoic acid is approximately 8-14% weight percent. The nucleating masterbatch ("Nuc. MB") was cyanuric acid that had been previously compounded at a rate of 33% (by weight) into a base resin of 3-hydroxybutanoic acid and 4-hydroxybutanoic acid, and pelleted. The PBSA was BIONOLLE® 3001 polymer (Showa Highpolymer Co., Ltd., Japan).

Figure 4:
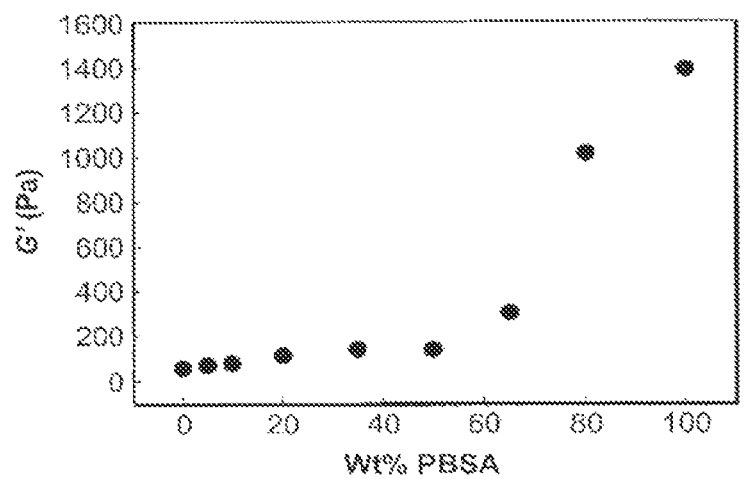
FIG. 4 is a plot showing G' of vs. Wt % PBSA.
Figure 5:
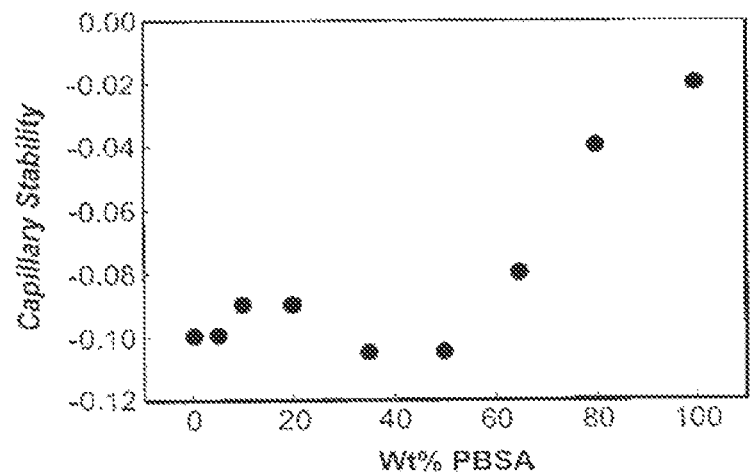
FIG. 5 is a plot showing capillary stability vs. Wt % PBSA.

Formulation 1 is the PHA control (no PBSA). Formulation 9 is the PBSA control (no PHA Blend). The PHA control displays considerably lower melt viscosity and melt strength compared to PBSA. The melt stability of the PHA is also worse compared to that of PBSA. G' and capillary stability for the formulations are plotted as a function of formulation composition below. These parameters appear to be quite independent of formulation composition when PBSA is the minor component and strongly dependent on formulation composition when PBSA is the major component. In other words, the increase in G' with increasing levels of the higher melt strength PBSA in the formulation is very modest up to a formulation composition of about 50% PBSA. As the concentration of PBSA in these formulations is increased further, the increase in G' becomes significant as it approaches the G' of the pure PBSA. In terms of capillary stability, PBSA is considerably more stable compared to the pure PHA. The capillary stability of all formulations with PHA as the major component is very similar to that of the PHA control; however, when PBSA becomes the major component, a systematic improvement in stability is evident with increasing levels of PBSA. The crystallization rate (Tmc) of PHA decreases slightly in the presence of PBSA; however, Tmc does not appear to depend on PBSA concentration. All of the data for this particular formulation series indicate a multi-phase melt with very little miscibility between the PHA and PBSA. Finally, formulations of PHA with PBS behaved quite similar to formulations of PHA and PBSA. See FIG. 4 and FIG. 5.

Example 3

Compositions Containing PHA Blends and PBS Combined with Organic Peroxide

In Examples 1 and 2, blends of PHA with either PBS or PBSA were prepared using simple melt-extrusion. The melt rheology of these formulations indicated the existence of two distinct phases in the melt, with the rheological signature of the major formulation component dominating the overall response. In this example, blends of PHA with PBS are presented, where the melt-blending was carried out in the presence of an organic peroxide. A common plasticizer, CITROFLEX® A4 plasticizer, was also included in these formulations. All of the components for each formulation were physically mixed at a pre-determined ratio, and this mixture was then subjected to twin-screw extrusion in a ¾"-inch Brabender extruder operated at about 50 rpm and a melt temperature of about 180° C. The formulation compositions are indicated in the table below.

TABLE 3

Compositions containing PHA blend, PBS and organic peroxide

|  | Formulation | |
|---|---|---|
|  | 1 | 2 |
| PHA Blend (wt %) | 72 | 72 |
| Nuc.MB (wt %) | 3 | 3 |
| CITROFLEX ® A4 plasticizer | 5 | 4.8 |
| Peroxide (wt %) | 0 | 0.2 |
| PBS (wt %) | 20 | 20 |
| Total | 100 | 100 |
| Data: | | |
| G' (@ 0.25 rad/s) | 148 | 865 |
| Eta* (@ 0.25 rad/s) | 3380 | 7342 |
| Capillary Stability | 00.14 | −0.12 |
| Tmc (PHA Blend) | 103.1 | 105.0 |
| Tmc (PBS) | 84.0 | 85.7 |

The PHA blend was composed of about 58-62% homo-polymer of 3-hydroxybutanoic acid, and about 38-42% co-polymer of 3-hydroxybutanoic acid and 4-hydroxybutanoic acid, where the 4-hydroxybutanoic acid is approximately 8-14% weight percent. The nucleating masterbatch ("Nuc. MB") was cyanuric acid that had been previously compounded at a rate of 33% (by weight) into a base resin of 3-hydroxybutanoic acid and 4-hydroxybutanoic acid, and pelleted. The peroxide was tert-butylperoxy-2-ethylhexyl-carbonate (available from Akzo Nobel as TRIGANOX® 117 peroxide). The PBS was BIONOLLE® 1001 polymer (Showa Highpolymer Co., Ltd., Japan).

Figure 6:
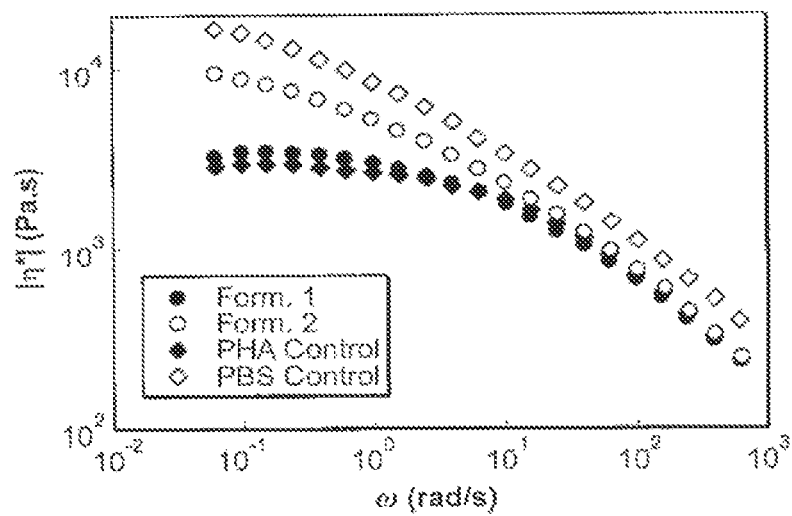
FIG. 6 is a plot of formulations vs. controls.

Formulation 1 is the first control with about 20 weight percent PBS. Formulation 2 is similar in composition to Formulation 1 with the exception of about 0.2 percent of an organic peroxide (TRIGANOX® 117 peroxide) pre-dissolved in CITROFLEX® A4 plasticizer prior to the mixing of the formulation components. Formulation 2 displays considerably higher melt strength (G') and better melt stability (smaller capillary stability) compared to Formulation 1; further, the PHA and PBS appear to crystallize at higher temperatures in formulations prepared with peroxide. The melt rheology (complex viscosity versus angular frequency) for Formulation 1 and 2 are shown in FIG. 6; the data for the corresponding PHA control (Formulation 1 from Examples 1 and 2) and the PBS are also. In this figure, the control formulation for this example, Formulation 1, shows rheological behavior very similar to that of the PHA control. However, the rheological signature of Formulation 2 appeared to be in between those of the PHA control and the PBS control. In other words, the formulation prepared using reactive extrusion (in the presence of an organic peroxide) showed rheological characteristics intermediate to those of the PHA and PBS controls. See FIG. 6.

Example 4

Compositions Containing PHA Blends and PBSA Combined with Organic Peroxide

This example is very similar to Example 3, except that PBSA (BIONOLLE® 3001 polymer) was used in place of PBS (BIONOLLE® 1001 polymer).

TABLE 4

Compositions containing PHA blend, PBSA and organic peroxide

|  | Formulation | |
| --- | --- | --- |
|  | 1 | 2 |
| PHA Blend (wt %) | 72 | 72 |
| Nuc.MB (wt %) | 3 | 3 |
| CITROFLEX ® A4 plasticizer | 5 | 4.8 |
| Peroxide (wt %) | 0 | 0.2 |
| PBSA (wt %) | 20 | 20 |
| Total | 100 | 100 |
| Data: | | |
| G' (@ 0.25 rad/s) | 105 | 398 |
| Eta* (@ 0.25 rad/s) | 3080 | 4659 |
| Capillary Stability | 00.14 | −0.11 |
| Tmc (PHA Blend) | 106.0 | 107.3 |
| Tmc (PBSA) | nd | nd |

"nd" = not detectable

The PHA blend was composed of about 58-62% homopolymer of 3-hydroxybutanoic acid, and about 38-42% co-polymer of 3-hydroxybutanoic acid and 4-hydroxybutanoic acid, where the 4-hydroxybutanoic acid is approximately 8-14% weight percent. The nucleating masterbatch ("Nuc. MB") was cyanuric acid that had been previously compounded at a rate of 33% (by weight) into a base resin of 3-hydroxybutanoic acid and 4-hydroxybutanoic acid, and pelleted. The peroxide was tert-butylperoxy-2-ethylhexylcarbonate (available from Akzo Nobel as TRIGANOX® 117 peroxide). The PBSA was BIONOLLE® 3001 polymer (Showa Highpolymer Co., Ltd., Japan).

In Examples 1 and 2, blends of PHA with either PBS or PBSA were prepared using simple melt-extrusion. The melt rheology of these formulations indicated the existence of two distinct phases in the melt, with the rheological signature of the major formulation component dominating the overall response. In this example, combinations of PHA with PBSA are presented wherein the melt-blending was carried out in the presence of an organic peroxide. A common plasticizer, CITROFLEX® A4 plasticizer, was also included in these formulations. All of the components for each formulation were physically mixed at a pre-determined ratio; this mixture was subjected to twin-screw extrusion in a ¾ inch Brabender extruder operated at about 50 rpm and a melt temperature of about 180° C. The compositions are indicated in the table above. Formulation 1 is the first control with about 20 weight percent PBSA. Formulation 2 is similar in composition to Formulation 1 with the exception of about 0.2 percent of an organic peroxide (TRIGANOX® 117 peroxide) pre-dissolved in CITROFLEX® A4 plasticizer prior to the mixing of the formulation components. Formulation 2 displays considerably higher melt strength (G') and better melt stability (smaller capillary stability) compared to Formulation 1; further, the PHA crystallizes at higher temperature in formulations prepared with peroxide.

The observations presented in this Example are largely similar to those presented in Example 3. In summary, when PHA/PBSA formulations are prepared by simple melt-extrusion, their melt rheology suggest a multi-phase melt with the major formulation component dominating the response on a rheological length scale. In contrast, when the same formulations are prepared using reactive melt-extrusion, the rheological response indicate a single-phase melt with some unexpected benefits in melt strength and melt stability. The PHA phase also crystallizes at a higher temperature when the formulation is prepared using reactive extrusion.

Examples 3 and 4 show the distinct melt rheological advantages (higher melt strength and superior melt stability) when blends of PHA and PBS or PBSA are created using reactive melt-extrusion in the presence of very small amounts of an organic peroxide. The improvements noted in melt strength and capillary stability (melt stability) are unexpected and very advantageous (melt properties for making films and related material).

Reactive melt extrusion is studied further in the subsequent examples.

Example 5

Films Containing PHA/PBSA Blends Melt-Compounded in the Presence of an Organic Peroxide In Examples 1 and 2, the characteristics of PHA/PBS and PHA/PBSA formulations prepared by simple melt-blending were discussed. The melt rheology of these formulations indicated poor miscibility between the two polymers with the rheology of the major component dominating the overall response. In Examples 3 and 4, it was shown that when PHA/PBS and PHA/PBSA formulations are prepared by melt-blending in the presence of a reactive compound such as an organic peroxide, some synergistic rheological observations are evident. These formulations, created in a reactive environment, displayed considerably higher melt strength and better melt stability compared to formulations created without peroxide; the PHA phase also crystallizes at a higher temperature in these formulations.

The present example is an extension of Example 4, wherein a different PHA is melt-compounded with PBSA in the presence of an organic peroxide and a branching co-agent. The relative proportions of the PHA and PBSA phases were varied while all other additives (plasticizer, mineral fillers) were kept unchanged. The compositions are described in table below. These compositions were created using a 27 mm MAXX Leistritz co-rotating twin-screw extruder with the 10 barrel and die zones set at 175/175/170/170/170/165/165/165/160/160 (° C.). Other compounding data and conditions are also listed in the table.

TABLE 5

Compositions containing PHA blend, PBSA and organic peroxide

| | Formulation | | | | |
|---|---|---|---|---|---|
| | 1 | 2 | 3 | 4 | PBSA |
| PHA Blend (wt %) | 79 | 71 | 59 | 47 | |
| PBSA (wt %) | 0 | 8 | 20 | 32 | |
| Nuc.MB (wt %) | 3 | 3 | 3 | 3 | |
| Slip/Antiblock MB (wt %) | 5 | 5 | 5 | 5 | |
| CITROFLEX ® A4 plasticizer | 7.75 | 7.75 | 7.75 | 7.75 | |
| Peroxide (wt %) | 0.15 | 0.15 | 0.15 | 0.15 | |
| PE3A (wt %) | 0.10 | 0.10 | 0.10 | 0.10 | |
| CaCO3 (wt %) | 5 | 5 | 5 | 5 | |
| Total | 100 | 100 | 100 | 100 | |
| Compounding Data: | | | | | |
| Screw RPM | 125 | 125 | 150 | 150 | |
| Rate (lbs/hr) | 85 | 85 | 75 | 75 | |
| Melt Temp (° C.) | 189 | 196 | 204 | 209 | |
| Melt Pressure (psi) | 2321 | 2395 | 2530 | 2649 | |
| Load (%) | 46 | 46 | 40 | 41 | |
| Data: | | | | | |
| G' (@ 0.25 rad/s) | 549 | 689 | 1413 | 2584 | 1383 |
| Eta* (@ 0.25 rad/s) | 6975 | 7380 | 8749 | 13420 | 13560 |
| Capillary Stability | −0.09 | −0.08 | −0.06 | −0.06 | −0.02 |
| Tmc (PHA Blend) | 105.9 | 103.4 | 101.8 | 99.1 | — |
| Tmc (PBSA) | — | nd | 60.2 | 64.3 | 65.0 |
| Film MD Tear (g) | 18.2 | 32.8 | 38 | 39.4 | 24 |
| Film TD Tear (g) | 29.8 | 36 | 42 | 45.6 | 32 |
| Film Dart Impact (g) | 25 | 52 | 59 | 70 | 200 |
| Film MD Modulus (MPa) | 395 | 369 | 359 | 306 | 320 |
| Film MD Break Strength (MPa) | 18.5 | 21.8 | 23 | 22.8 | 40.0 |
| Soil Biodegradation (Wt loss after 5 weeks (grams)) | 0.207 | 0.117 | 0.085 | 0.054 | 0.031 |

The PHA blend was composed of about 34-38% homopolymer of 3-hydroxybutanoic acid, and about 22-26% co-polymer of 3-hydroxybutanoic acid and 4-hydroxybutanoic acid, where the 4-hydroxybutanoic acid is approximately 8-14 weight percent, and about 38-42% co-polymer of 3-hydroxybutanoic acid and 4-hydroxybutanoic acid with the 4-hydroxybutanoic acid composition being nominally 25-33 weight percent. The nucleating masterbatch ("Nuc. MB") was cyanuric acid that had been previously compounded at a rate of 33% (by weight) into a base resin of 3-hydroxybutanoic acid and 4-hydroxybutanoic acid, and pelleted. The slip anti-block masterbatch was a mixture of erucamide (20% by weight) diatomaceous earth (15% by weight) nucleant masterbatch (3% by weight), pelleted into PHA (62% by weight). The peroxide was tert-butylperoxy-2-ethylhexylcarbonate (available from Akzo Nobel as TRIGANOX® 117 peroxide). The PBSA was BION-OLLE® 3001 polymer (Showa Highpolymer Co., Ltd., Japan). "PE3A" is pentaerythritol triacrylate. The CaCO3 was calcium carbonate (EMFORCE® Bio calcium carbonate, available from (Specialty Minerals Inc., Bethlehem, Pa., USA).

Figure 7:
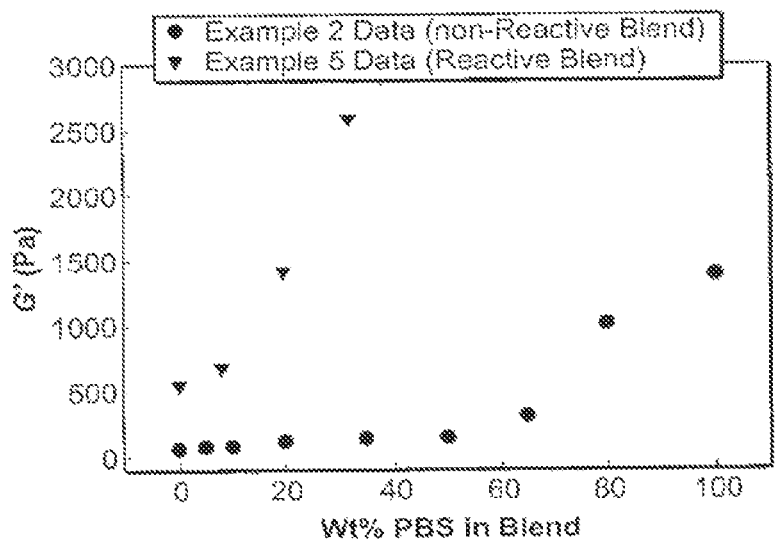
FIG. 7 is a plot showing G' of vs. Wt % PBS in Blend.
Figure 8:
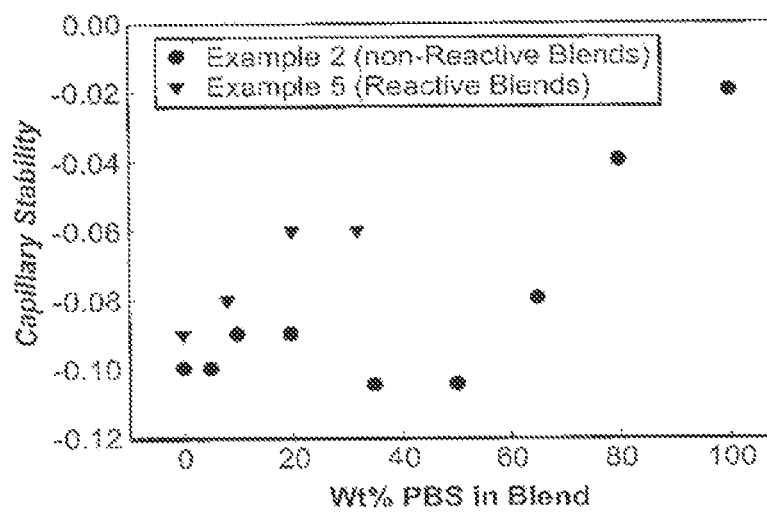
FIG. 8 is a plot showing capillary stability vs. Wt % PBS in Blend.

The table above lists the measured properties for the various formulations prepared. Formulation 1 is the control sample without any PBSA, while Formulations 2, 3, and 4 contain 8, 20 and 32 weight percent PBSA in the formulation. In FIG. 8, G' and capillary stability are shown as a function of composition for the samples from this example and for samples from Example 2 (non-reactive formulation counterparts). The advantages of combining in the presence of a reactive compound are distinct and surprising. The melt strength and melt stability are considerably superior for formulations created using reactive extrusion. In fact, both G' and capillary stability for these formulations are statistically better than what one might predict using a simple rule-of-mixtures trend. See FIG. 7 and FIG. 8.

The blends from this example (including pure PBSA) were also converted into blown film for further characterization. The blown films were made using a 1.5 inch 24:1 Davis Standard extruder fitted with a 2.5 inch spiral mandrel die and a Future Design dual-lip air ring. The temperature setting on the extruder was 350/345/340/330 (° F.) and the die was set at 335° F. The extruder was operated at 40 rpm with a die gap setting of about 40 mils. The films collected were about 2 mils in thickness at a blow-up ratio of about 2.5.

The film properties, particularly tear resistance, of the PHA/PBSA formulations created using reactive extrusion are considerably better than that of the PHA control and the PBSA control. This is another synergistic observation from such reactive blends. Another advantage of blending PBSA with PHA is the considerably slower rate of biodegradation of the resultant films relative to the PHA control. The soil biodegradation results for the reactive blend films, after 5 weeks in soil, show considerably lower weight loss compared to the control film.

Example 6

Films Containing PHA Blends and PBS Combined with Organic Peroxide

This example is largely similar to Example 5 and is somewhat of an extension to Example 3. Here, a different PHA is melt-compounded with PBS in the presence of an organic peroxide and a branching co-agent. The relative proportions of the PHA and PBS phases were varied while all other additives (plasticizer, mineral fillers) were kept unchanged. The compositions of these formulations are described in table below. These formulations were created using a 27 mm MAXX Leistritz co-rotating twin-screw extruder with the 10 barrel and die zones set at 175/175/170/170/170/165/165/165/160/160 (° C.). Other compounding data and conditions are also listed in the table.

The table above lists the measured properties for the various formulations prepared. Formulation 1 is the control sample without any PBSA, while Formulation 2, 3, and 4 contain 8, 20 and 32 weight percent PBS in the formulation. Similar to the observations for Example 5, the advantages of combining in the presence of a reactive compound are distinct and surprising. The melt strength and melt stability are considerably superior for the formulations created using reactive extrusion, much better than a rule-of-mixtures prediction.

TABLE 6

Compositions containing PHA blend, PBS and organic peroxide

| | Formulation | | | | |
| --- | --- | --- | --- | --- | --- |
| | 1 | 2 | 3 | 4 | PBSA |
| PHA Blend (wt %) | 79 | 71 | 59 | 47 | |
| PBS (wt %) | 0 | 8 | 20 | 32 | |
| Nuc.MB (wt %) | 3 | 3 | 3 | 3 | |
| Slip/Antiblock MB (wt %) | 5 | 5 | 5 | 5 | |
| CITROFLEX ® A4 plasticizer (wt %) | 7.75 | 7.75 | 7.75 | 7.75 | |
| Peroxide (wt %) | 0.15 | 0.15 | 0.15 | 0.15 | |
| PE3A (wt %) | 0.10 | 0.10 | 0.10 | 0.10 | |
| CaCO3 (wt %) | 5 | 5 | 5 | 5 | |
| Total | 100 | 100 | 100 | 100 | |
| Compounding Data: | | | | | |
| Screw RPM | 125 | 125 | 150 | 150 | |
| Rate (lbs/hr) | 85 | 85 | 75 | 75 | |
| Melt Temp (° C.) | 189 | 195 | 202 | 209 | |
| Melt Pressure (psi) | 2321 | 2415 | 2579 | 2632 | |
| Load (%) | 46 | 46 | 40 | 41 | |
| Data: | | | | | |
| G' (@ 0.25 rad/s) | 549 | 785 | 1390 | 2950 | 1288 |
| Eta* (@ 0.25 rad/s) | 6975 | 7818 | 9002 | 15020 | 12920 |
| Capillary Stability | −0.09 | −0.08 | −0.06 | −0.06 | −0.02 |
| Tmc (PHA Blend) | 105.9 | 101.5 | 100.5 | 100.0 | — |
| Tmc (PBS) | — | nd | 83.2 | 86.7 | 87.1 |
| Film MD Tear (g) | 18.2 | 24.8 | 34 | 34.2 | — |
| Film TD Tear (g) | 29.8 | 32 | 38.4 | 34.8 | — |
| Film Dart Impact (g) | 25 | 46 | 63 | 49 | — |
| Film MD Modulus (MPa) | 395 | 407 | 391 | 362 | — |
| Film MD Break Strength (MPa) | 18.5 | 17.2 | 23 | 26.4 | — |
| Soil Biodegradation (Wt loss after 5 weeks (grams)) | 0.207 | 0.115 | 0.075 | 0.049 | — |

"nd" = not detectable

The PHA blend was composed of about 34-38% homopolymer of 3-hydroxybutanoic acid, and about 22-26% co-polymer of 3-hydroxybutanoic acid and 4-hydroxybutanoic acid, where the 4-hydroxybutanoic acid is approximately 8-14 weight percent, and about 38-42% co-polymer of 3-hydroxybutanoic acid and 4-hydroxybutanoic acid with the 4-hydroxybutanoic acid composition being nominally 25-33 weight percent. The nucleating masterbatch ("Nuc. MB") was cyanuric acid that had been previously compounded at a rate of 33% (by weight) into a base resin of 3-hydroxybutanoic acid and 4-hydroxybutanoic acid, and pelleted. The slip anti-block masterbatch was a mixture of erucamide (20% by weight) diatomaceous earth (15% by weight) nucleant masterbatch (3% by weight), pelleted into PHA (62% by weight). The peroxide was tert-butylperoxy-2-ethylhexylcarbonate (available from Akzo Nobel as TRIGANOX® 117 peroxide). The PBS was BIONOLLE® 1000 polymer (Showa Highpolymer Co., Ltd., Japan). "PE3A" is pentaerythritol triacrylate. The CaCO3 was calcium carbonate (EMFORCE® Bio calcium carbonate, available from (Specialty Minerals Inc., Bethlehem, Pa., USA).

The formulations from this example were also converted into blown film for further characterization. The blown films were made using a 1.5 inch 24:1 Davis Standard extruder fitted with a 2.5 inch spiral mandrel die and a Future Design dual-lip air ring. The temperature setting on the extruder was 350/345/340/330 (° F.) and the die was set at 335° F. The extruder was operated at 40 rpm with a die gap setting of about 40 mils. The films collected were about 2 mils in thickness at a blow-up ratio of about 2.5.

The film properties, particularly tear resistance and dart impact resistance, of the PHA/PBSA formulations created using reactive extrusion are considerably better than that of the PHA control. Another advantage of combining PBSA with PHA is the considerably slower rate of biodegradation of the resultant films relative to the PHA control. The soil biodegradation results for the reactive formulation films, after 5 weeks in soil, show considerably lower weight loss compared to the control film.

Example 7

Injection Molded Articles Containing PHA Blends and PBS

In this example, PHA blend injection molding formulations were made that also included PBS. The formulations began with production of an injection molding composition containing PHA Blend 73% by weight, Acrawax C concentrate (50% active) 1% by weight, talc 11% by weight (FLEXTALC® 610D talc, available from Specialty Minerals Inc., Bethlehem, Pa., USA), calcium carbonate 10% by weight (MULTIFEX-MM® calcium carbonate, available from Specialty Minerals Inc., Bethlehem, Pa., USA), and nucleating masterbatch 5% by weight. The PHA blend was composed of about 58-62% homo-polymer of 3-hydroxybutanoic acid, and about 38-42% co-polymer of 3-hydroxybutanoic acid and 4-hydroxybutanoic acid, where the 4-hydroxybutanoic acid is approximately 8-14% weight percent. The nucleating agent is cyanuric acid dispersed at a rate of 33% (by weight) in CITROFLEX® A4 plasticizer and milled.

This injection molding composition was then dry-blended with PBS, or with PBS and peroxide. The peroxide was tert-butylperoxy-2-ethylhexylcarbonate (available from Akzo Nobel as TRIGANOX® 117 peroxide). The PBS was BIONOLLE® 1001 polymer (Showa Highpolymer Co., Ltd., Japan). The formulations are shown in the table below.

TABLE 7

Compositions containing PHA blend, PBS and organic peroxide

| | Formulation | | |
|---|---|---|---|
| | 1 | 2 | 3 |
| IM Composition (wt %) | 100 | 70 | 69.9 |
| PBS (wt %) | 0 | 30 | 30 |
| Peroxide (wt %) | 0 | 0 | 0.1 |
| Total | 100 | 100 | 100 |
| Compounding: | | | |
| Pressure (psi) | 1708 | 1589 | 3028 |
| Load (%) | 45 | 39 | 48 |
| Melt Temp (° C.) | 203 | 202 | 211 |
| Data: | | | |
| Tensile Strength (Mpa) | 25.68 | 27.52 | 29.41 |
| Tensile Modulus (Mpa) | 2765 | 1775 | 1747 |
| Tensile Elongation (%) | 4.07 | 11.49 | 17.41 |
| Flexural Strength (Mpa) | 46.14 | 40.03 | 41.07 |
| Flexural Modulus (Mpa) | 2872 | 1853 | 1832 |
| Notched Izod Impact Strength (ft-lb/in) | 0.528 | 0.735 | 0.859 |
| Onset Crystallization Temperature (° C.) | 118.4 | 107.4 | 109.6 |
| Peak Crystallization Temperature (° C.) | 113.89 | 103.81 | 105.49 |
| Zero Time Melt Viscosity, 100 s-1 (Pa · s) | 1447 | 1534 | 1919 |
| Five Minute Melt Viscosity, 100 s-1 (Pa · s) | 894 | 1186 | 1523 |
| Melt Stability (min-1) | −0.0962 | −0.0515 | −0.0462 |
| G' (0.25 rad/s) (Pa) | 115.9 | 1712 | 7887 |
| Eta * (0.25 rad/s) (Pa · s) | 3540 | 15200 | 37140 |

The above formulations were compounded using a 27 mm Leistritz twin-screw extruder using the following temp-profile: 175/175/175/175/170/170/170/170/170/180 (° C.); the formulations were made at 60 lbs/hr rate and 125 screw rpm.

All tensile properties were measured according to ASTM D638-03. All flexural properties were measured according to ASTM D790-03. Notched Izod impact strength was measured according to D256-06.

As shown above, tensile strength, tensile elongation and notched Izod were improved by addition of PBS, especially when melt-blended in the presence of a reactive compound, but tensile modulus, and flexural modulus and strength were negatively affected.

Melt stability, G' and Eta* were also greatly improved by addition of PBS, especially when melt-blended in the presence of a reactive compound.

The table above summarizes the melt rheology of the compounded pellets and the mechanical properties of injection molded bars from the above formulations. The advantages of combining PBS with PHA blends in the presence of peroxide are distinct as evident in G', melt capillary stability, tensile strength, tensile elongation and impact strength.

Example 8

Injection Molded Articles Containing PHA Blends and PBS

In this example, a slightly different injection molding composition was combined with PBS.

The formulations began with production of an injection molding composition containing PHA Blend 73.21% by weight, Acrawax C concentrate (50% active) 0.36% by weight, talc 11.66% by weight (FLEXTALC® talc 610D, available from Specialty Minerals Inc., Bethlehem, Pa., USA), calcium carbonate 10.2% by weight (EMFORCE® Bio calcium carbonate, available from Specialty Minerals Inc., Bethlehem, Pa., USA), and nucleating masterbatch 4.57% by weight. The PHA blend was composed of about 58-62% homo-polymer of 3-hydroxybutanoic acid, and about 38-42% co-polymer of 3-hydroxybutanoic acid and 4-hydroxybutanoic acid, where the 4-hydroxybutanoic acid is approximately 8-14% weight percent. The nucleating agent is cyanuric acid dispersed at a rate of 33% (by weight) in CITROFLEX® A4 plasticizer and milled.

This injection molding composition was compounded and then dry-blended with PBS. The PBS was BIONOLLE® 1001 polymer (Showa Highpolymer Co., Ltd., Japan). The formulations are shown in the table below.

TABLE 8

Compositions containing PHA blend and PBS

| | Formulation | | | |
|---|---|---|---|---|
| | 1 | 2 | 3 | 4 |
| IM Composition (wt %) | 100 | 90 | 80 | 50 |
| PBS (wt %) | 0 | 10 | 20 | 50 |
| Total | 100 | 100 | 100 | 100 |
| Data: | | | | |
| Tensile Strength (Mpa) | 27.1 | 26.5 | 27.4 | 33.0 |
| Tensile Modulus (Mpa) | 2915 | 2249 | 1959 | 1322 |
| Tensile Elongation (%) | 5.4 | 5.6 | 7.6 | 19.9 |

TABLE 8-continued

Compositions containing PHA blend and PBS

| | Formulation | | | |
|---|---|---|---|---|
| | 1 | 2 | 3 | 4 |
| Flexural Strength (Mpa) | 36.1 | 41.6 | 39.8 | 36.1 |
| Flexural Modulus (Mpa) | 2748 | 2197 | 1879 | 1306 |
| Notched Izod Impact Strength (ft-lb/in) | 0.577 | 0.601 | 0.729 | 0.989 |
| Onset Crystallization Temperature (° C.) | 118.29 | 114.22 | 115.16 | 111.21 |
| Peak Crystallization Temperature (° C.) | 113.82 | 110.19 | 111.21 | 106.33 |

As shown above, the addition of PBS caused a decrease in the flexural and tensile modulus, but caused an increase in tensile strength, tensile elongation, and notched impact strength. The peak crystallization temperature was also decreased.

Figure 9:
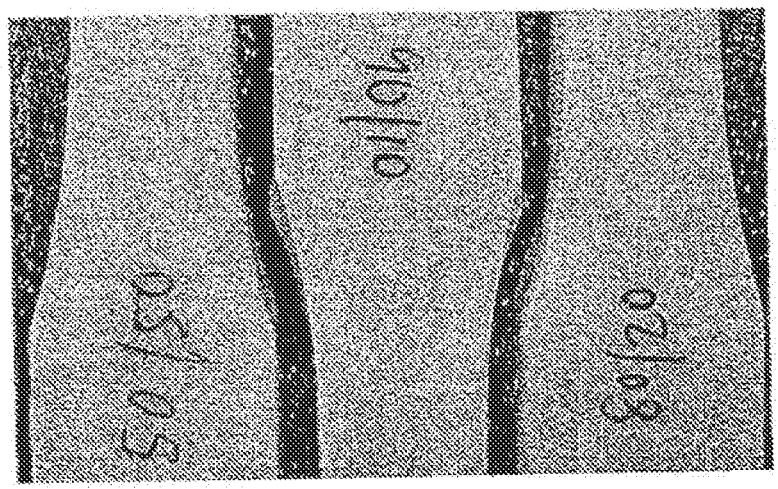
FIG. 9 is a photo demonstrating different percentage of the blend in injection molded test bars.
Figure 10:
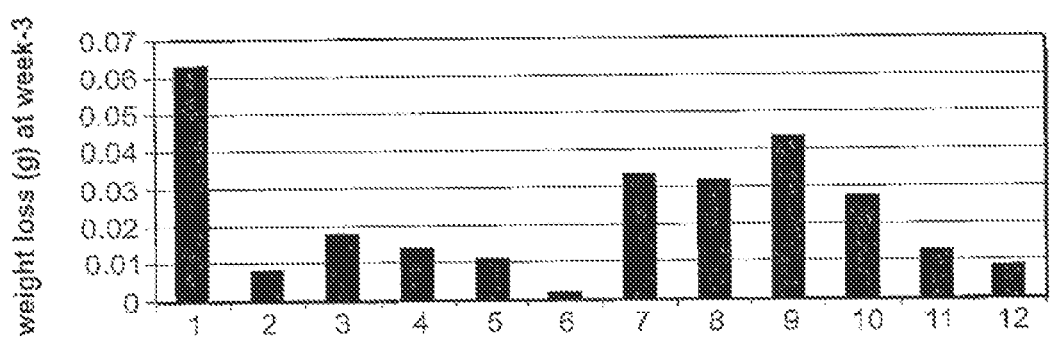
FIG. 10 is a plot showing weight loss of the 12 different formulations of Table 10.
Figure 11:
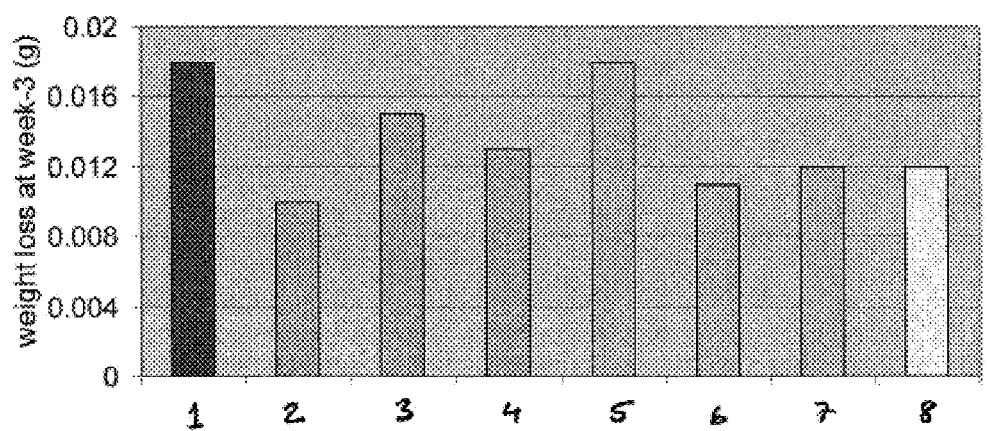
FIG. 11 is a plot showing weight loss of the 8 different formulations of Table 13.

Addition of PBS also appeared to decrease the level of flash seen in injection molded test bars, as shown in FIG. 9.

Example 9

Extruded Films Containing PBS or PBSA

In this example, extruded films were made and tested for biodegradability. The following PHA formulation was made.

TABLE 9

PHA Formulation for Extruded Film

| Ingredient | Wt % |
|---|---|
| PHA Blend | 78.00 |
| Nucleating Masterbatch | 3.00 |
| Calcium Carbonate | 5.00 |
| Slip Antiblock Masterbatch | 5.00 |
| CITROFLEX ® A4 plasticizer | 8.73 |
| Peroxide | 0.18 |
| PE3A | 0.09 |

The PHA blend was composed of about 10-14% homopolymer of 3-hydroxybutanoic acid, and about 46-50% co-polymer of 3-hydroxybutanoic acid and 4-hydroxybutanoic acid, where the 4-hydroxybutanoic acid is approximately 8-14 weight percent, and about 38-42% co-polymer of 3-hydroxybutanoic acid and 4-hydroxybutanoic acid with the 4-hydroxybutanoic acid composition being nominally 25-33 weight percent. The nucleating masterbatch was cyanuric acid that had been previously compounded at a rate of 33% (by weight) into a base resin of 3-hydroxybutanoic acid and 4-hydroxybutanoic acid, and pelleted. The slip antiblock masterbatch was a mixture of erucamide (20% by weight) diatomaceous earth (15% by weight) nucleant masterbatch (3% by weight), pelleted into PHA (62% by weight). The peroxide was tert-butylperoxy-2-ethylhexylcarbonate (available from Akzo Nobel as TRIGANOX® 117 peroxide). PE3A was pentaerythritol triacrylate.

The formulation was compounded into pellets, which were then used to make cast film using a ¾ inch RandCastle extruder.

Monolayer film was made from the above formulation. Monolayer PBSA film was also made. Coextruded film was also made, of composition PBSA/PHA Formulation/PBSA.

The same PHA formulation was combined with various antimicrobial agents to produce monolayer extruded films, as described above. PolySept® Z microbial (available from PolyChem Alloy) is a organic salt based, non-migratory antimicrobial. "UDA" is *Urtica dioica* agglutinin. AgION is a silver compound. AMICAL® 48 silver is diiodomethyl p-tolyl sulfone.

Biodegradability of the films was tested by soil burial for three weeks. The results are shown in the table and the graph below.

TABLE 10

Weight Loss of Extruded Films Buried in Soil

| | | Week 2 | | Week 3 | |
|---|---|---|---|---|---|
| Film No. | | thickness (mm) | weight loss (g) | thickness (mm) | weight loss (g) |
| 1 | PHA Blend monolayer film (10 mil) | 0.276 | 0.007 | 0.284 | 0.063 |
| 2 | PBSA (2 mil) | 0.064 | 0.004 | 0.060 | 0.008 |
| 3 | PBSA/PHA/PBSA (35 take up) | 0.100 | 0.007 | 0.102 | 0.018 |
| 4 | PBSA/PHA/PBSA (70 take up) | 0.096 | 0.007 | 0.106 | 0.014 |
| 5 | PHA Blend monolayer film + 0.5% PolySept ® Z microbial | 0.190 | 0.004 | 0.193 | 0.011 |
| 6 | PHA Blend monolayer film + 1.0% PolySept ® Z microbial | 0.245 | 0.002 | 0.240 | 0.002 |
| 7 | PHA Blend monolayer film + 1.0% UDA | 0.239 | 0.008 | 0.233 | 0.034 |
| 8 | PHA Blend monolayer film + 2.5% UDA | 0.233 | 0.009 | 0.235 | 0.032 |
| 9 | PHA Blend monolayer film + 0.5% AgION | 0.245 | 0.014 | 0.234 | 0.044 |
| 10 | PHA Blend monolayer film + 2.0% AgION | 0.229 | 0.004 | 0.252 | 0.028 |
| 11 | PHA Blend monolayer film + 0.1% AMICAL ® 48 silver | 0.205 | 0.007 | 0.191 | 0.013 |
| 12 | PHA Blend monolayer film + 0.8% AMICAL ® 48 silver | 0.216 | 0.008 | 0.229 | 0.009 |

The PBSA monolayer film degraded more slowly than the monolayer film made from the PHA blend.

As shown above, the PHA blend with added antimicrobial agents such as AMICAL® 48 silver and PolySept® Z microbial degraded more slowly than the equivalent PHA blend film made without antimicrobial agents included. It degraded at approximately the same rate as PBSA film.

Example 10

Blown Films Containing PBS or PBSA

In this example, blown films were made and tested for biodegradability. The following PHA formulation was made.

TABLE 11

PHA Formulation for Blown Film

| Ingredient | Wt % |
|---|---|
| PHA Blend | 78.00 |
| Nucleating Masterbatch | 3.00 |
| Calcium Carbonate | 5.00 |
| Slip Antiblock Masterbatch | 5.00 |
| CITROFLEX ® A4 plasticizer | 8.73 |
| Peroxide | 0.18 |
| PE3A | 0.09 |

The PHA blend was composed of about 34-38% homopolymer of 3-hydroxybutanoic acid, and about 22-26% co-polymer of 3-hydroxybutanoic acid and 4-hydroxybutanoic acid, where the 4-hydroxybutanoic acid is approximately 8-14 weight percent, and about 38-42% co-polymer of 3-hydroxybutanoic acid and 4-hydroxybutanoic acid with the 4-hydroxybutanoic acid composition being nominally 25-33 weight percent. The nucleating masterbatch was cyanuric acid that had been previously compounded at a rate of 33% (by weight) into a base resin of 3-hydroxybutanoic acid and 4-hydroxybutanoic acid, and pelleted. The slip antiblock masterbatch was a mixture of erucamide (20% by weight) diatomaceous earth (15% by weight) nucleant masterbatch (3% by weight), pelleted into PHA (62% by weight). The peroxide was tert-butylperoxy-2-ethylhexyl-carbonate (available from Akzo Nobel as TRIGANOX® 117 peroxide). PE3A was pentaerythritol triacrylate.

This PHA formulation was then combined with PBS or PBSA, in ratios of 90/10 (formulations 2 and 5), 75/25 (formulations 3 and 6), and 60/40 (formulations 4 and 7) ratios of PHA blend and PBS or PBSA, as shown.

TABLE 12

Formulations for Blown Film

| Ingredient | 1 | 2 | 3 | 4 | 5 | 6 | 7 | 8 |
|---|---|---|---|---|---|---|---|---|
| PHA Formulation | 78.00 | 70.2 | 58.5 | 46.8 | 70.2 | 58.5 | 46.8 | 58.5 |
| PBS | — | 7.8 | 19.5 | 31.2 | — | — | — | — |
| PBSA | — | — | — | — | 7.8 | 19.5 | 31.2 | — |

Blown films were made from these formulations, and tested by soil burial. The results are shown in the table and the graph below.

TABLE 13

Weight Loss of Blown Films Made with Antimicrobial Agents

| Film No. | | Week 2 | | Week 3 | |
|---|---|---|---|---|---|
| | | thickness (mm) | weight loss (g) | thickness (mm) | weight loss (g) |
| 1 | PHA Blend monolayer film | 0.058 | 0.007 | 0.063 | 0.018 |
| 2 | PHA Blend/PBS monolayer film (90/10) | 0.070 | 0.009 | 0.039 | 0.010 |
| 3 | PHA Blend/PBS monolayer film (75/25) | 0.062 | 0.006 | 0.057 | 0.015 |
| 4 | PHA Blend/PBS monolayer film (60/40) | 0.046 | 0.007 | 0.068 | 0.013 |
| 5 | PHA Blend/PBSA monolayer film (90/10) | 0.045 | 0.011 | 0.071 | 0.018 |
| 6 | PHA Blend/PBSA monolayer film (75/25) | 0.059 | 0.007 | 0.057 | 0.011 |
| 7 | PHA Blend/PBSA monolayer film (60/40) | 0.065 | 0.008 | 0.049 | 0.012 |

Films 2-7 showed a slower rate of weight loss relative to the control (film no. 1).

Example 11

Compositions Containing PHBV and PBSA with Organic Peroxide

In several previous examples, it was shown that when PHA/PBS and PHA/PBSA formulations are prepared by melt-blending in the presence of a reactive compound such as an organic peroxide, some synergistic rheological observations are evident. These formulations, created in a reactive environment, displayed considerably higher melt strength and better melt stability compared to formulations created without peroxide; the PHA phase also crystallized at a higher temperature in these formulations.

The present example shows data for a PHBV (7% HV) melt-compounded with PBSA in the presence of an organic peroxide. The relative proportions of the PHBV and PBSA phases were varied while all other additives (plasticizer) were kept unchanged. Formulations 1-4 were made without peroxide while Formulations 5-8 included 0.2% by wt. peroxide. The compositions are described in Table 14 below along with the melt viscosity, melt strength and melt stability data. All formulations were compounded using a 27 mm MAXX Leistritz co-rotating twin-screw extruder with the ten barrels and die zones set at 175/175/170/170/170/165/165/165/160/160 (° C.).

TABLE 14

Compositions containing PHBV and PBSA reactively blended with peroxide.

|  | 1 | 2 | 3 | 4 | 5 | 6 | 7 | 8 |
|---|---|---|---|---|---|---|---|---|
| Component (Wt %) | | | | | | | | |
| PHBV* | 95 | 85 | 75 | 65 | 95 | 85 | 75 | 65 |
| PBSA BIONOLLE ® 3001 polymer | 0 | 10 | 20 | 30 | 0 | 10 | 20 | 30 |
| CITROFLEX ®A4 plasticizer | 5 | 5 | 5 | 5 | 4.8 | 4.8 | 4.8 | 4.8 |
| Peroxide | 0 | 0 | 0 | 0 | 0.2 | 0.2 | 0.2 | 0.2 |
| Total (Wt %) | 100 | 100 | 100 | 100 | 100 | 100 | 100 | 100 |
| Torsional Melt Rheology | | | | | | | | |
| G' @ 0.25 rad/s (Pa) | 3 | 3 | 17 | 47 | 68 | 22 | 616 | 757 |
| Eta* @ 0.25 rad/s (Pa · s) | 520 | 521 | 759 | 1088 | 904 | 798 | 4182 | 4418 |
| Capillary Melt Rheology | | | | | | | | |
| Eta @ 5 min (Pa · s) | 341 | 339 | 359 | 373 | 330 | 375 | 414 | 532 |
| Capillary Melt Stability | −0.13 | −0.11 | −0.10 | −0.10 | −0.12 | −0.12 | −0.09 | −0.08 |

*PHBV in the above table was previously compounded with nucleating agent and plasticizer The PBSA blended with PHBV was BIONOLLE® 3001 polymer (Showa Highpolymer Co., Ltd., Japan). The peroxide used in this example was TRIGONOX® 131 peroxide (tert-amylperoxy 2-ethylhexyl carbonate) from Akzo Nobel. The data in Table 14 shows that with the addition of PBSA, the melt strength was improved by a factor of 16 compared to the PHBV composite. Marginal improvements with PBSA addition were also observed for the melt stability and viscosity. However with the addition of the peroxide, the melt strength improved by a factor of 250 for the highest level of PBSA added. The melt stability also improved by 39% while the melt viscosities were also shown to improve.

Example 12

Compositions Containing PHA, PBS, Organic Peroxide and Co-Agent

In this example, rheological data for a PHA reactively melt-compounded with PBS in the presence of an organic peroxide and co-agent is presented. The proportions of the PHA and PBS phases as well as the additive were kept constant while the concentrations of peroxide and co-agent were varied. Other additives included in the formulations were SUPERCOAT™ calcium carbonate (Imerys Performance Minerals), a Plasticizer Masterbatch which was a 50/50 mixture of the plasticizers CITROFLEX® A4 plasticizer (Vertellus Specialties Inc.) and PARAPLEX™ 8600 plasticizer (Hallstar); a Slip/antiblock Master Batch which was a mixture composed of 15% by wt. Erucamide (Croda), 15% by wt. OPTIBLOC™ 10 talc filler (Specialty Minerals), a nucleating agent master batch Nuc. MB #1 which was composed of cyanuric acid compounded at 33% by wt. into a base PHA resin of 3-hydroxybutanoic acid and 4-hydroxybutanoic acid and 68% by wt. PHA copolymer blend composed of about 34-38% homo-polymer of 3-hydroxybutanoic acid, and about 22-26% co-polymer of 3-hydroxybutanoic acid and 4-hydroxybutanoic acid, where the 4-hydroxybutanoic acid is approximately 10-12 weight percent, and about 38-42% co-polymer of 3-hydroxybutanoic acid and 4-hydroxybutanoic acid with the 4-hydroxybutanoic acid composition being nominally 30 weight percent; peroxide branching agent (Akzo Nobel) #1—TRIGONOX® 101 peroxide (2,5-di(tert-butylperoxy)hexane) and #2—TRIGONOX® 131 peroxide (tert-amylperoxy 2-ethylhexyl carbonate); co-agent SR231 diethyleneglycol dimethacrylate (Sartomer). The PBS was BIONOLLE® 1001 polymer (Showa Highpolymer Co., Ltd., Japan). The PHA was a blend composed of about 34-38% homo-polymer of 3-hydroxybutanoic acid, and about 22-26% co-polymer of 3-hydroxybutanoic acid and 4-hydroxybutanoic acid, where the 4-hydroxybutanoic acid is approximately 8-14 weight percent, and about 38-42% co-polymer of 3-hydroxybutanoic acid and 4-hydroxybutanoic acid with the 4-hydroxybutanoic acid composition being nominally 25-33 weight percent. The compositions are described in Table 15 below along with the melt viscosity and melt strength data.

All formulations were compounded using a 26 mm Coperion co-rotating, twin-screw extruder using the following temperatures (from feed to die) 100/175 to 180/190/150/139/141/138/140/152/158 to 160/174/220 (° C.), screw speed was 350 rpm and die pressure 1730 psi.

TABLE 15

Compositions containing PHA and PBS reactively blended with peroxide and co-agent.

|  | 1 | 2 | 3 | 4 |
|---|---|---|---|---|
| Component (Wt %) | | | | |
| PHA | 45 | 45 | 45 | 45 |
| PBS BIONOLLE ® 1001 polymer | 30 | 30 | 30 | 30 |
| CaCO₃ | 10 | 10 | 10 | 10 |
| Nuc. MB #1 | 3 | 3 | 3 | 3 |
| Slip/antiblock MB | 4 | 4 | 4 | 4 |
| Plasticizer MB | 7.87 | 7.92 | 7.93 | 7.95 |
| Peroxide #1 | 0 | 0 | 0.04 | 0.03 |
| Peroxide #2 | 0.08 | 0.05 | 0 | 0 |
| Co-agent SR231 | 0.05 | 0.03 | 0.03 | 0.02 |
| Total (Wt %) | 100 | 100 | 100 | 100 |
| Torsional Melt Rheology | | | | |
| G' @ 0.25 rad/s (Pa) | 2383 | 1216 | 1651 | 1945 |
| Eta* @ 0.25 rad/s (Pa · s) | 14620 | 9710 | 13380 | 14390 |

The data in Table 15 shows that the type and amount of peroxide and co-agent used to reactively blend the PBS with PHA can have an effect on the rheological properties of the final mixture. Therefore the type and amount of peroxide/co-agent in the formulation needs to be optimized together in order to maximize the melt properties for each blend.

Unless otherwise expressly specified, all of the numerical ranges, amounts, values and percentages, such as those for amounts of materials, elemental contents, times and temperatures of reaction, ratios of amounts, and others, in the following portion of the specification and attached claims may be read as if prefaced by the word "about" even though the term "about" may not expressly appear with the value, amount, or range. Accordingly, unless indicated to the contrary, the numerical parameters set forth in the following specification and attached claims are approximations that may vary depending upon the desired properties sought to be obtained by the present invention. At the very least, and not as an attempt to limit the application of the doctrine of equivalents to the scope of the claims, each numerical parameter should at least be construed in light of the number of reported significant digits and by applying ordinary rounding techniques.

Notwithstanding that the numerical ranges and parameters setting forth the broad scope of the invention are approximations, the numerical values set forth in the specific examples are reported as precisely as possible. Any numerical value, however, inherently contains error necessarily resulting from the standard deviation found in its underlying respective testing measurements. Furthermore, when numerical ranges are set forth herein, these ranges are inclusive of the recited range end points (i.e., end points may be used). When percentages by weight are used herein, the numerical values reported are relative to the total weight.

Also, it should be understood that any numerical range recited herein is intended to include all sub-ranges subsumed therein. For example, a range of "1 to 10" is intended to include all sub-ranges between (and including) the recited minimum value of 1 and the recited maximum value of 10, that is, having a minimum value equal to or greater than 1 and a maximum value of equal to or less than 10. The terms "one," "a," or "an" as used herein are intended to include "at least one" or "one or more," unless otherwise indicated.

Any patent, publication, or other disclosure material, in whole or in part, that is said to be incorporated by reference herein is incorporated herein only to the extent that the incorporated material does not conflict with existing definitions, statements, or other disclosure material set forth in this disclosure. As such, and to the extent necessary, the disclosure as explicitly set forth herein supersedes any conflicting material incorporated herein by reference. Any material, or portion thereof, that is said to be incorporated by reference herein, but which conflicts with existing definitions, statements, or other disclosure material set forth herein will only be incorporated to the extent that no conflict arises between that incorporated material and the existing disclosure material.

Unless otherwise defined, all technical and scientific terms used herein have the same meaning as commonly understood by one of ordinary skill in the art to which this invention belongs. Although methods and materials similar or equivalent to those described herein is used in the practice or testing of the present invention, suitable methods and materials are described below. All publications, patent applications, patents, and other references mentioned herein are incorporated by reference in their entirety. In case of conflict, the present specification, including definitions, will control. In addition, the materials, methods, and examples are illustrative only and not intended to be limiting.

All of the features disclosed in this specification may be combined in any combination. Each feature disclosed in this specification may be replaced by an alternative feature serving the same, equivalent, or similar purpose. Thus, unless expressly stated otherwise, each feature disclosed is only an example of a generic series of equivalent or similar features.

From the above description, one skilled in the art can easily ascertain the essential characteristics of the present invention, and without departing from the spirit and scope thereof, can make various changes and modifications of the invention to adapt it to various usages and conditions. Thus, other embodiments are also within the scope of the following claims.

While this invention has been particularly shown and described with references to preferred embodiments thereof, it will be understood by those skilled in the art that various changes in form and details may be made therein without departing from the scope of the invention encompassed by the appended claims.

What is claimed is:

1. A composition, comprising:
a blend of a first component and a second component,
wherein the first component includes a poly(butylene succinate) (PBS) or a polybutylene succinate adipate (PBSA), and the second component includes a polyhydroxyalkanoate (PHA),
wherein the content of the first component in the composition is 50% or greater by weight, wherein the second component is selected from a group consisting of a homopolymer or a copolymer of a 3-hydroxyalkanoate, a homopolymer or a copolymer of 4-hydroxyalkanoate, and a homopolymer or a copolymer of a 5-hydroxyalkanoate.

2. The composition of claim 1, wherein the blend of a first component and a second component is an unreacted blend.

3. The composition of claim 1, wherein the content of the first component in the composition is between 50% and 80% by weight.

4. The composition of claim 3, wherein the content of the first component in the composition is between 50% and 65% by weight.

5. The composition of claim 1, wherein the PHA is a PHA copolymer.

6. The composition of claim 1, wherein the PHA copolymer is a copolymer of a 3-hydroxybutyrate (PHB copolymer).

7. The composition of claim 6, wherein the PHA copolymer is a Type 1 PHB copolymer.

8. The composition of claim 6, wherein the PHA copolymer is a Type 2 PHB copolymer.

9. The composition of claim 6, wherein the PHA copolymer is a copolymer of a poly(3-hydroxybutyrate-co-3-hydroxypropionate), a poly(3-hydroxybutyrate-co-4-hydroxybutyrate), a poly(3-hydroxybutyrate-co-4-hydroxyvalerate), a poly(3-hydroxybutyrate-co-3-hydroxyvalerate), a poly(3-hydroxybutyrate-co-3-hydroxyhexanoate), or a poly(3-hydroxybutyrate-co-5-hydroxyvalerate).

10. The composition of claim 1, wherein the second component PHA is a PHA homopolymer.

11. The composition of claim 10, wherein the PHA homopolymer is a poly(3-hydroxybutyrate).

12. An article, comprising the composition of claim 1.

13. The article of claim 12, wherein the article is a film.

* * * * *